(12) United States Patent
Morita

(10) Patent No.: US 6,563,282 B2
(45) Date of Patent: May 13, 2003

(54) MOTOR CONTROL APPARATUS

(75) Inventor: Tetsuya Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 09/817,038

(22) Filed: Mar. 27, 2001

(65) Prior Publication Data
US 2001/0045806 A1 Nov. 29, 2001

(30) Foreign Application Priority Data

Mar. 31, 2000 (JP) ........................................ 2000-096082
Mar. 31, 2000 (JP) ........................................ 2000-098330
Mar. 31, 2000 (JP) ........................................ 2000-098331

(51) Int. Cl.[7] ............................................ G05B 19/10
(52) U.S. Cl. ........................ 318/567; 318/625; 318/696
(58) Field of Search ................... 318/567, 696, 318/625

(56) References Cited

U.S. PATENT DOCUMENTS

| | | | | |
|---|---|---|---|---|
| 3,813,592 A | * | 5/1974 | Ryberg | ........................ 318/601 |
| 4,641,073 A | * | 2/1987 | Sawada | ........................ 318/685 |
| 5,051,679 A | * | 9/1991 | Kaneko | ........................ 318/685 |
| 5,369,566 A | * | 11/1994 | Pfost et al. | .................... 700/18 |
| 5,583,410 A | * | 12/1996 | Jacobson et al. | ........... 318/625 |

* cited by examiner

*Primary Examiner*—Rita Leykin
(74) *Attorney, Agent, or Firm*—Fitzpatrick, Cella, Harper & Scinto

(57) ABSTRACT

With a memory access control portion without being intermediated by control of a CPU controlling an entire drive control of a motor, velocity data for setting velocity of a motor step by step are read out from a velocity table memory, and data value read out from the velocity table are converted by a time conversion circuit to time data, and based hereon a phase switching signal to operate the motor is generated in a phase signal generating portion. In addition, outputting of next data is requested to a memory access control portion in every time data output of a time conversion apparatus and occurrence of access to a next memory table is urged.

14 Claims, 15 Drawing Sheets

MOTOR CONTROL APPARATUS

BACKGROUND OF THE INVENTION

1. Field of the Invention

The present invention relates to a motor control apparatus, in particular, a motor control apparatus to drive-control a motor controlled by combination of a plurality of phase signals.

2. Related Background Art

Conventionally, as a power source to convey paper sheet or the like for a printer, etc., and as driving means for such a sheet delivery mechanism or the like, a motor (stepping motor) controlled by a combination of phase signals is being used.

FIG. 13 is to show a configuration of a motor control portion to control a motor as described above in a conventional image-forming apparatus or the like. In FIG. 13, in which reference numeral 2001 denotes a CPU to control a series of operations while reference numeral 2002 denotes a system bus, respective configuring members are brought into connection to this system bus. Reference numeral 2003 denotes a ROM of the CPU, where a program and respective kinds of data are stored.

Reference numeral 2004 denotes a data RAM, reference numeral 2005 denotes a timer IC, reference numeral 2006 denotes an interrupt signal from the timer IC, reference numeral 2007 denotes phase pattern signals to operate the motor, reference numeral 2008 denotes a buffer circuit to interface the motor with the CPU, and reference numeral 2009 denotes the motor.

The CPU 2001 receives the interruption from the timer IC in every constant time to control the phase pattern signals of the motor 2009 via a bus interface circuit or a buffer circuit configured by an amplifier based on the drive data expanded in the ROM 2003 or the RAM 2004. That is, the CPU 2001 reads out the drive data and transfers them to the buffer circuit 2008.

FIG. 14 shows operation timing of the motor in FIG. 13. Here, the motor 2009 is to operate in combination of two phase signals of the signal A and the signal B, and combination of the respective signal levels is changed to give the states of T1 to T4 to give rise to a predetermined angular rotation. (Subsequently, T4 goes back to T1)

FIG. 15 is to show how acceleration as well as constant speed rotation is executed on the motor controlled by conventional configuration in FIG. 13 or the like. FIG. 15 shows velocity and time in a motor in a graph, wherein, as shown in the drawing, phase switching is executed at the points of time t1, t2 or the like so that control is changed gradually from a slow velocity to a fast velocity, and is controlled at a constant velocity at the time point of the reference numeral 4001. Generally, this kind of motor requires a high torque at the time when rotation starts, and therefore it is required to start the operation at a low velocity and change it gradually to a high velocity operation.

Incidentally, as concerns the velocity of the motor, as shown in FIG. 14, the rotational angle due to change in the state of the phase signal is constant, thereby the period of the phase signal given to the motor is shortened so that the motor is rapidly switched from T1 to T2, T3, and T4 to consequently rotate at a higher speed.

The bottom part in FIG. 15 is to show an example of velocity control of the motor by phase switching, and an operation such as to switch the phase signal of the motor from T1 to T2 in FIG. 3 at a certain time point t1 and switch it from T2 to T3 at a time point t2 repeatedly to make the time until the respective phase signals is switched gradually shorter.

Here, the motor velocity control method in a conventional system will be described with reference to FIG. 13 again.

The CPU 2001 in FIG. 13 prepares the velocity table on the RAM 2004 (or ROM 2003) to operate the motor 2009 by instruction of the not shown operation panel or the like. In addition, the phase signal to be supplied to the motor gives the output signal of the CPU or T1 pattern to the motor 2009 via the buffer circuit 2008.

In addition, the operation start order is given to the timer 2005 to set the initial value of the drive data table. Thereafter, the operation of the timer 2005 gives rise to interruption 2006 for the CPU 2001, then the CPU 2001 in receipt of this interruption rewrites the phase signal to the motor 2007 as T2 to read out the next table value from the RAM 2004 to set it into the timer 2005. This operation is repeated sequentially so as to stop renewing the timer at the time when the speed has reached a predetermined one and to proceed with a constant speed operation by only renewing the phase signal pattern thereafter. The operation stipulated so far, the operation in FIG. 15 is realized.

However, in the above described prior art configuration, based on interruption from the timer IC the phase signal is switched lead by the CPU, giving rise to the following problems.

1) Time Delay of Switching Timing of Phase Signal

Time delay from interruption to setting of the signal takes place, giving rise to an inconvenience of dispersion in rotation velocity in general except such a case that the phase switching time is not problematic since it is sufficiently large compared with the interruption processing time.

2) Decrease in Processing Velocity of CPU Due to Interruption

In the case where there exists a plurality of motors and the rotation velocity of the motor is fast, the interval of interruption to be inputted to the CPU becomes short, giving rise to an inconvenience that the other processing efficiency of the CPU gets worse.

3) Increase in Table Memory

In a system where a plurality of acceleration-deceleration characteristics of a motor are required, the values of the table increase, giving rise to cost-up.

SUMMARY OF THE INVENTION

The present invention has been made in view of the points described so far, and the object thereof is to provide a motor control apparatus capable of reducing load of a CPU being control means and of operation at a high speed by simple and inexpensive configuration.

In addition, the present invention can be embodied simply and inexpensively in the motor control apparatus, can reduce load of the CPU being control means, and an object hereof is to enable the memory capacity to store the motor drive data table to be reduced.

That is, according to the present invention, in a motor control apparatus to drive-control a motor to be controlled in combination of a plurality of phase signals, comprising:

a velocity table memory storing velocity data for setting velocity of the above described motor step by step;

a memory access control portion to sequentially read out data of said velocity table without being intermediated by control of a CPU controlling the entire drive control of the motor;

time conversion means to convert data value read out from the above described velocity table to time data; and a phase signal generating portion to generate phase switching signals to operate the above described motor based on an output of the above described time conversion means, wherein such a configuration has been adopted in that with time data output signals of said the above described time conversion means, occurrence of access to a next memory table toward the above described memory access control portion is urged.

In addition, according to the present invention, in a motor control apparatus to drive-control a motor to be controlled in combination of a plurality of phase signals, a configuration has been adopted so as to comprise:

a velocity table memory storing velocity data for setting velocity of the above described motor step by step;

a memory access control portion to sequentially read out data of said velocity table without being intermediated by control of a CPU controlling the entire drive control of the motor;

time conversion means to convert data value read out from the above described velocity table to time data;

a phase signal generating portion to generate phase switching signals to operate the above described motor based on an output of the above described time conversion means; and interval control means to urge the above described memory access control portion to give rise to occurrence of access to a next memory table in a number of predetermined times of time data output of the above described time conversion means and to control the above described time conversion means so as to operate with same data values read out from the above described velocity table up to then.

In addition, in the present invention, in a motor control apparatus to drive-control a motor to be controlled in combination of a plurality of phase signals, a configuration has been adopted so as to comprise:

a velocity table memory storing velocity data for setting velocity of the above described motor step by step;

a memory access control portion to sequentially read out data of said velocity table without being intermediated by control of a CPU controlling the entire drive control of the motor;

time conversion means to convert data value read out from the above described velocity table to time data;

a phase signal generating portion to generate phase switching signals to operate the above described motor based on an output of the above described time conversion means; and a step register to set a variation amount of a read-out address when said memory access control portion sequentially reads out data of said velocity table.

The objects and advantages described so far as well as other objects and advantages of the present invention will become apparent from descriptions using preferred embodiments as follows.

DETAILED DESCRIPTION OF THE PREFERRED EMBODIMENTS

Embodiments of the present invention will be described with reference to drawings.

First Embodiment

Figure 1:
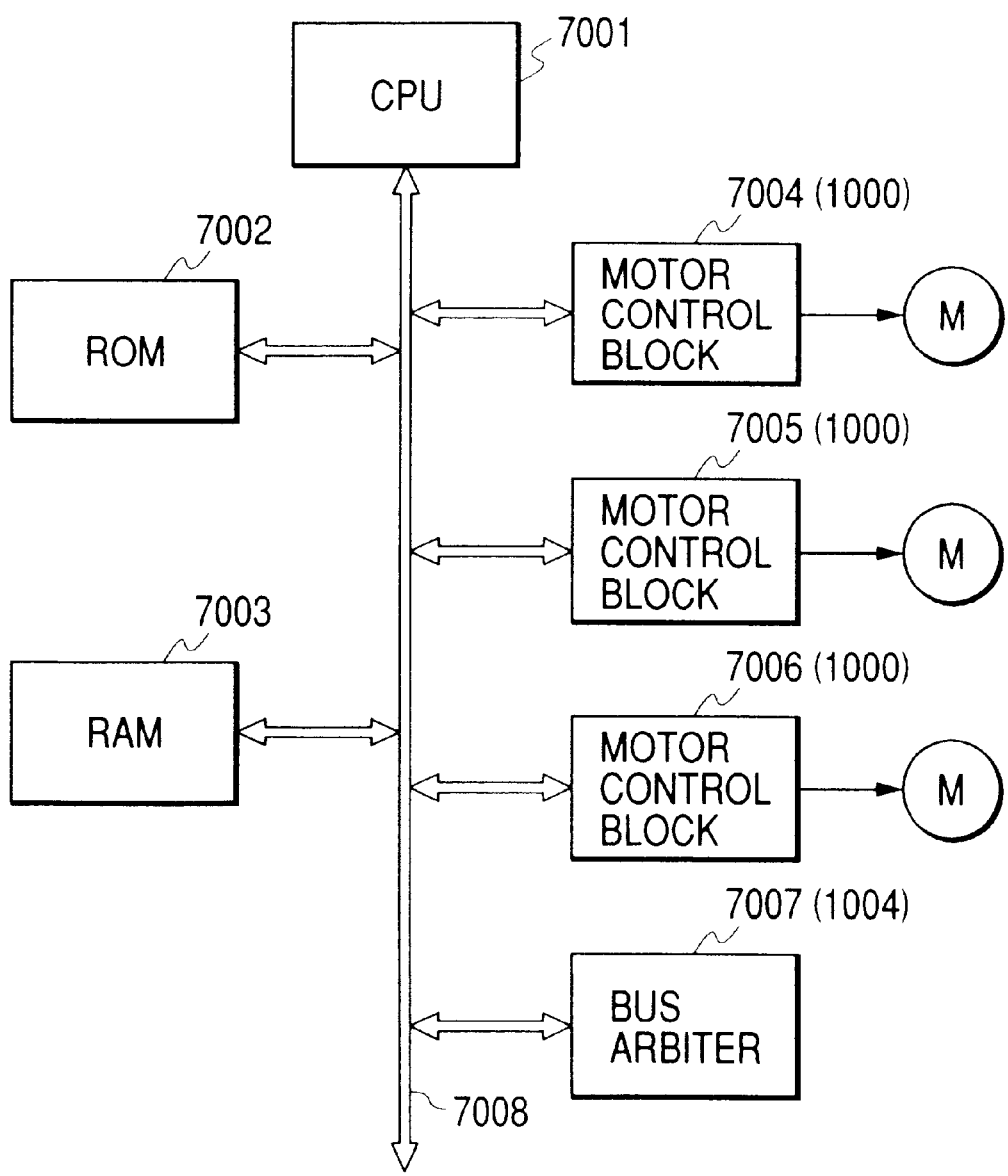
FIG. 1 is a drawing showing a configuration of an embodiment of a motor control circuit according to the present invention.
Figure 2:
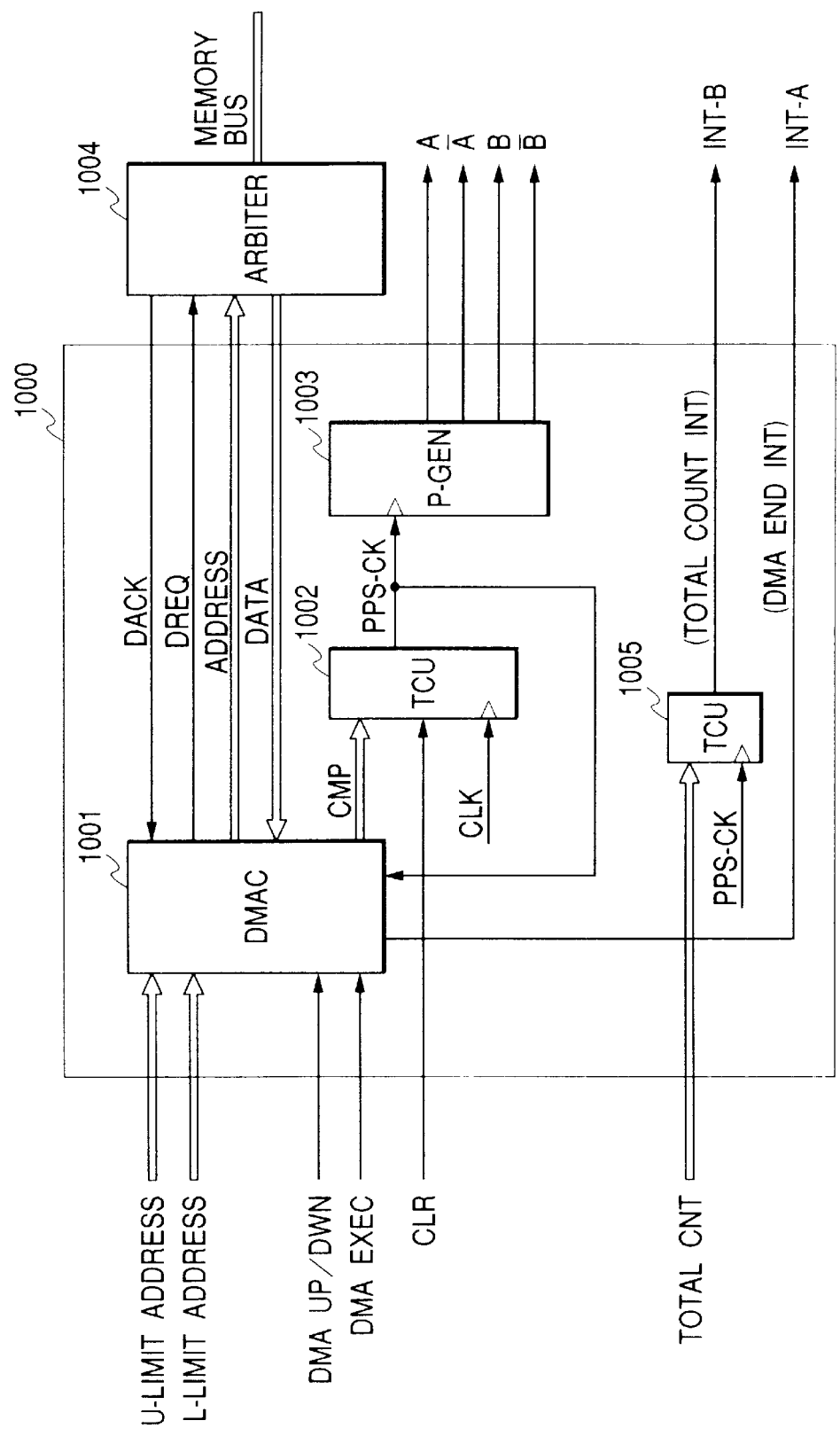
FIG. 2 is a drawing showing a configuration example of a motor control block.

An embodiment of a motor control circuit in which the present invention is adopted is shown in FIG. 1 and FIG. 2. FIG. 1 shows entire configuration of a motor control circuit to which the present invention is applied, and FIG. 2 shows configuration of a portion thereof, in particular, a motor control block portion in detail.

In FIG. 1, reference numeral 7001 denotes a CPU controlling a series of operations, and the CPU 7001 drive-controls a motor according to a program stored in the ROM 7002 with RAM 7003 as a work area.

In FIG. 1, three motors (M) are provided to be used as power source for paper delivery of a printer, etc. and are controlled by respective motor control blocks denoted by reference numerals 7004 to 7006 respectively.

In the present embodiment, the CPU 7001 does not control the input and output of the motor drive data directly. The input and output of the motor drive data is executed by the above described motor control blocks 7004 to 7006 and the bus arbitration circuit (bus arbiter) 7007. The bus arbiter 7007 is for an access to velocity table data from the motor control block by controlling the later-described DMA (Direct Memory Access).

FIG. 2 shows detailed configuration around the above described motor control blocks 7004 to 7006.

In FIG. 2, reference numeral 1000 denotes a motor control block equivalent to the motor control blocks 7004 to 7006 in FIG. 1. In FIG. 2, reference numeral 1001 denotes a memory access control portion configured by a DMAC (DMA controller), reference numeral 1002 denotes a timer conversion circuit configured by a timer circuit, 1003 denotes a phase signal generating portion (the detailed configuration thereof to be described later) to generate the phase signal of the motor, the reference numeral 1004 denotes a bus arbitration circuit for accessing the memory for storing the velocity table (for example, the above described ROM 7002 or RAM 7003).

The present embodiment is not lead by the CPU 7001, but input and output of the drive data of the motor, that is, the velocity table data, is executed by the motor control block 1000 as well as the bus arbitration circuit 1004.

Reference numeral 1005 denotes a timer circuit to generate interruption at any rotation step to be used for motor drive control of the CPU 7001.

That is, in the present embodiment, the memory access control portion 1001 loads on a time conversion circuit 1002 data read in from the velocity table memory sequentially via the bus arbitration circuit 1004 ("CMP" signal) generates "PPS-CLK" signals and generates phase switching signals to the phase signal generating portion 1003 every time when the time conversion circuit 1002 finalizes clocking.

In addition, this "PPS-CLK" signal is fed back to the memory access control portion 1001 to urge the next data to be read in toward the memory access control portion 1001.

An example of the velocity table of the motor is shown in Table 1. The velocity table storage memory in Table 1 starts in the address 100 and continues up to the address 162, and the data in the right end in the table are stored in each address. The left side of the table does not show the data actually stored, but shows as an example actual accumulated drive time, control velocity (PPS), acceleration (PPS/ms) and drive time (m/s) corresponding with respective data in a drive system. In this example, the motor is controlled to give the initial velocity of 220 PPS and so as to finally reach 2941 PPS.

Figure 3:
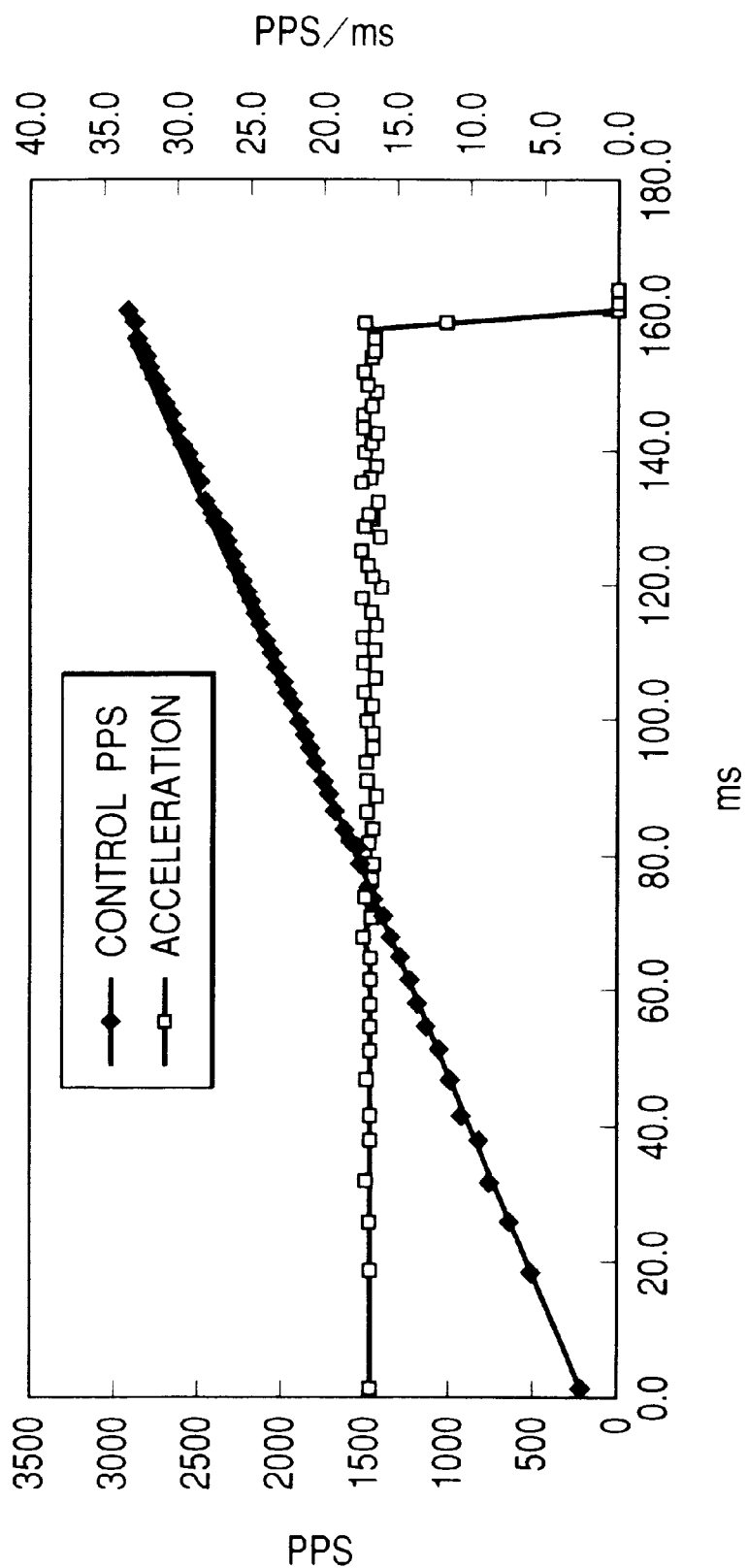
FIG. 3 is a graph showing an example of acceleration timing.

The table in Table 1 is graphed as in FIG. 3, and as shown in FIG. 3, this operation is to accelerate the motor at constant acceleration, and acceleration changes linearly in horizontal direction and velocity changes along a constant inclined line. In addition, in order to configure such drive conditions, it will be apparent that interval of phase switching of the motor must be controlled long immediately after a start so that thereafter it gets short gradually.

Next, the operation in the configuration described so far will be described in detail.

In the case where the motor starts up with the CPU 7001 in FIG. 1, the drive data are to be loaded in the velocity table storing memory. In addition, at first the CPU 7001 sets a start address (START ADDRESS in FIG. 1) and an end address (END ADDRESS in FIG. 1) in the memory access control portion 1001. In the example of Table 1, the start address is 100, and the end address is 162.

Subsequently, the memory access control portion 1001 outputs "DREQ" signals being address signals and request signals to the bus arbitration circuit 1004 in order to read data of the first address (for example, the data 214 at the address 100 in Table 1).

Thereby, the bus arbitration circuit 1004 executes timing arbitration with the memory access request from another motor control portion so as to output data to the memory access control portion 1001 when data of the requested address is read in and output the signal "DACK" to notify of confirmation on the data.

Thereby, the memory access control portion 1001 outputs the read-in velocity table data as "CMP" signals to a time conversion circuit 1002 comprising a timer circuit.

Thereafter, the stage goes forward to the timing to operate the motor actually, the "CLR" signal is set OFF toward the time conversion circuit 1002, and the "DMA-EXEC" signals meaning a start is inputted to the memory access control portion 1001.

Thereby, when an internal counter of the time conversion circuit 1002 operates to reach the value inputted by the "CMP" signal, the signal "PPS-CLK" is inputted to the phase signal generating portion 1003. This signal "PPS-CLK" is also inputted to the memory access control portion 1001 so that second velocity data are inputted to the time conversion circuit 1002 and the memory access control portion 1001 is urged to read in the next (third) velocity data. In order to proceed with memory access, the bus arbitration circuit 1004 is requested for data.

The above described operation is continued so that "PPS-CLK" being the phase switching signal is generated based on the velocity table in Table 1, at last reaches the address of that table memory, and the value of PPS reaches the velocity of 2941, at that point of time, the memory access control portion of 1001 finalizes memory access then and onward, outputs "DMA-END" being an interrupting signal to show that the acceleration operation of the motor is finalized, and notifies the CPU 7001 accordingly. In addition, the TCU 1005 notifies the CPU of the fact that the motor has gone ahead by any rotational angle from any point of time while the CPU 7001 executes a predetermined motor control based on the notified rotational angle.

As described so far, based on the velocity table, the occurrence interval of the "PPS-CLK" is controlled to get gradually shorter and thus the motor can be accelerated.

Next, based on "PPS-CLK", the configuration to generate the motor control signal will be described. Here, the motor of the present embodiment shall be driven in four phases of "A", "A–", "B" and "B–".

Figure 4:
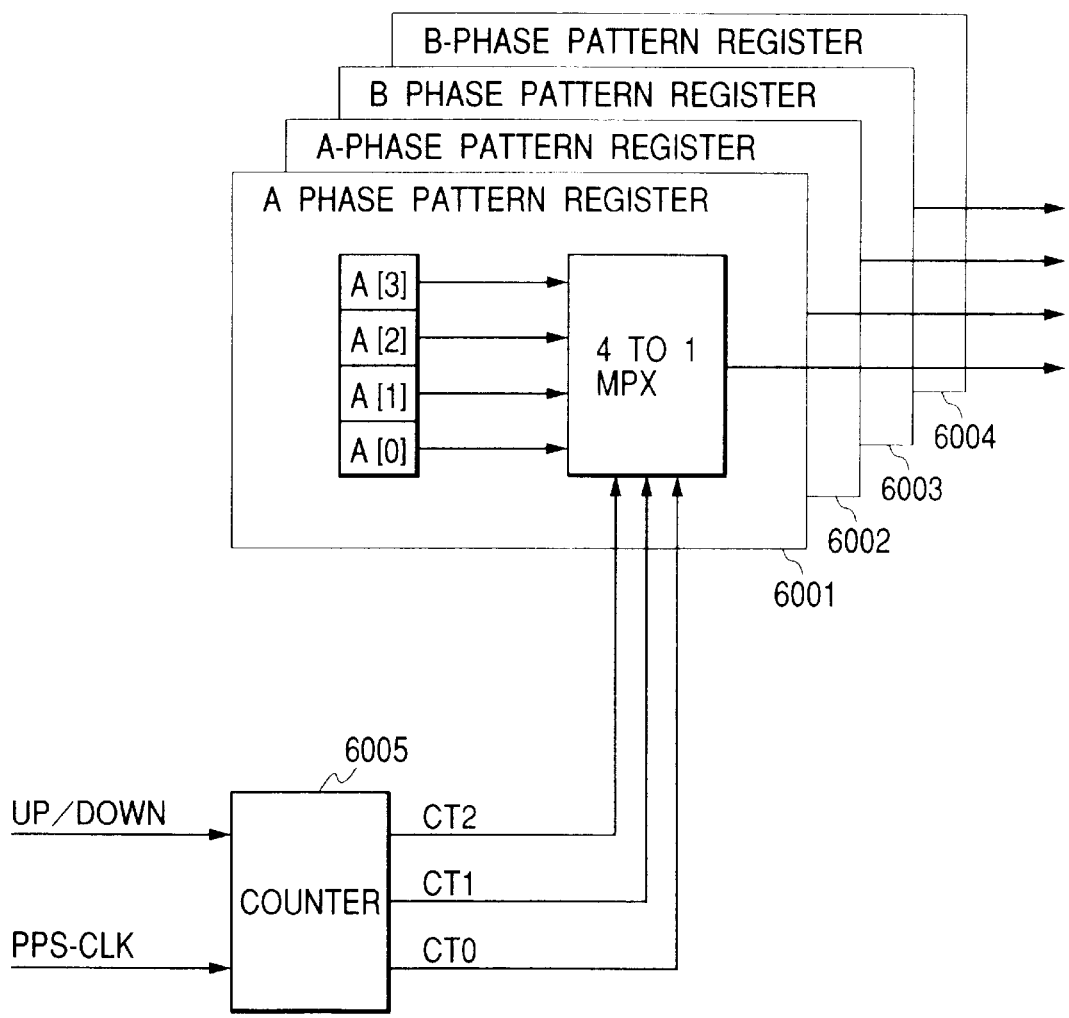
FIG. 4 is a drawing showing a configuration of a phase signal generating block.

FIG. 4 has shown in detail the configuration of the phase signal generating portion 1003 generating the phase signal of the motor in FIG. 2. In FIG. 4, registers 6001 to 6004 are allocated to the respective "A", "A–", "B" and "B–" signals of four phases to be generated to store the corresponding pattern data.

In FIG. 4, reference numeral 6005 denotes a counter, which operates every time when the PPS-CLK is inputted and is to output a corresponding bit value in the above described registers to be regarded as the phase signal. The counter 6005 can reverse the progressing direction of the phase signal pattern by UP/DOWN switching, thereby also can control the rotary direction of the motor.

In the case where there are eight combinations of phase signals of the motor, the registers 6001 to 6004 are configured by 8 bit registers (A[0] to A[3]in case of the register 6001 in FIG. 4) so as to operate to give REG[0]→REG[1] →REG[2]→REG[3]→REG[0] as output signals at the time of UP count and operate to give REG[0]→REG[3]→REG [2]→REG[1]→REG[0] as output signals at the time of DOWN count (the above described "REG" is equivalent to the registers A[0] to A[3] in FIG. 4 and to B[0] to B[3] in case of B phase. The output signal is outputted to one of excitation phases of the motor via a 4 into 1 multiplexer.

By configuring the phase signal generating portion 1003 as described above, also in the case where only single velocity table is given, various acceleration pattern of respective motors can be created.

Figure 5:
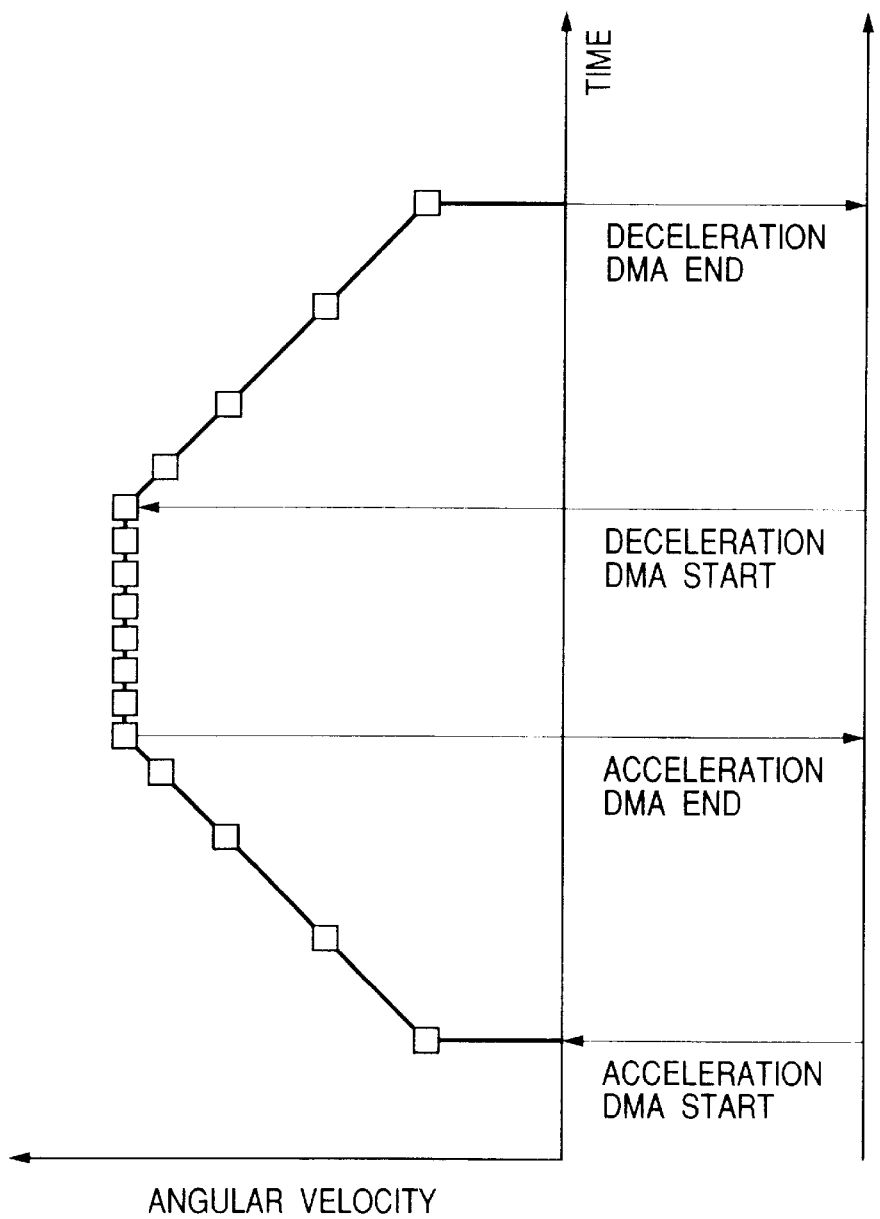
FIG. 5 is a drawing showing an operation example from startup of a motor to stoppage thereof.

Incidentally, so far only acceleration operation has been described, it goes without saying that deceleration can also be controlled with similar configuration if a velocity table for deceleration is prepared. For example, FIG. 5 shows an operation a motor through start, acceleration, a constant speed operation, deceleration, and a halt. Here, in order to read the velocity table of acceleration setting to start the acceleration operation, the DMA is started, and at the time when finalization interruption of the DMA takes place, the motor operates a constant speed rotation while, at the time when deceleration and a halt are required, the CPU 7001 starts DMA to read the deceleration table. In addition, with the DMA finalization interruption taking place at the time when the deceleration table is finalized, the CPU 7001 can detect that the rotation of the motor has reached the lowest velocity.

Figure 6:
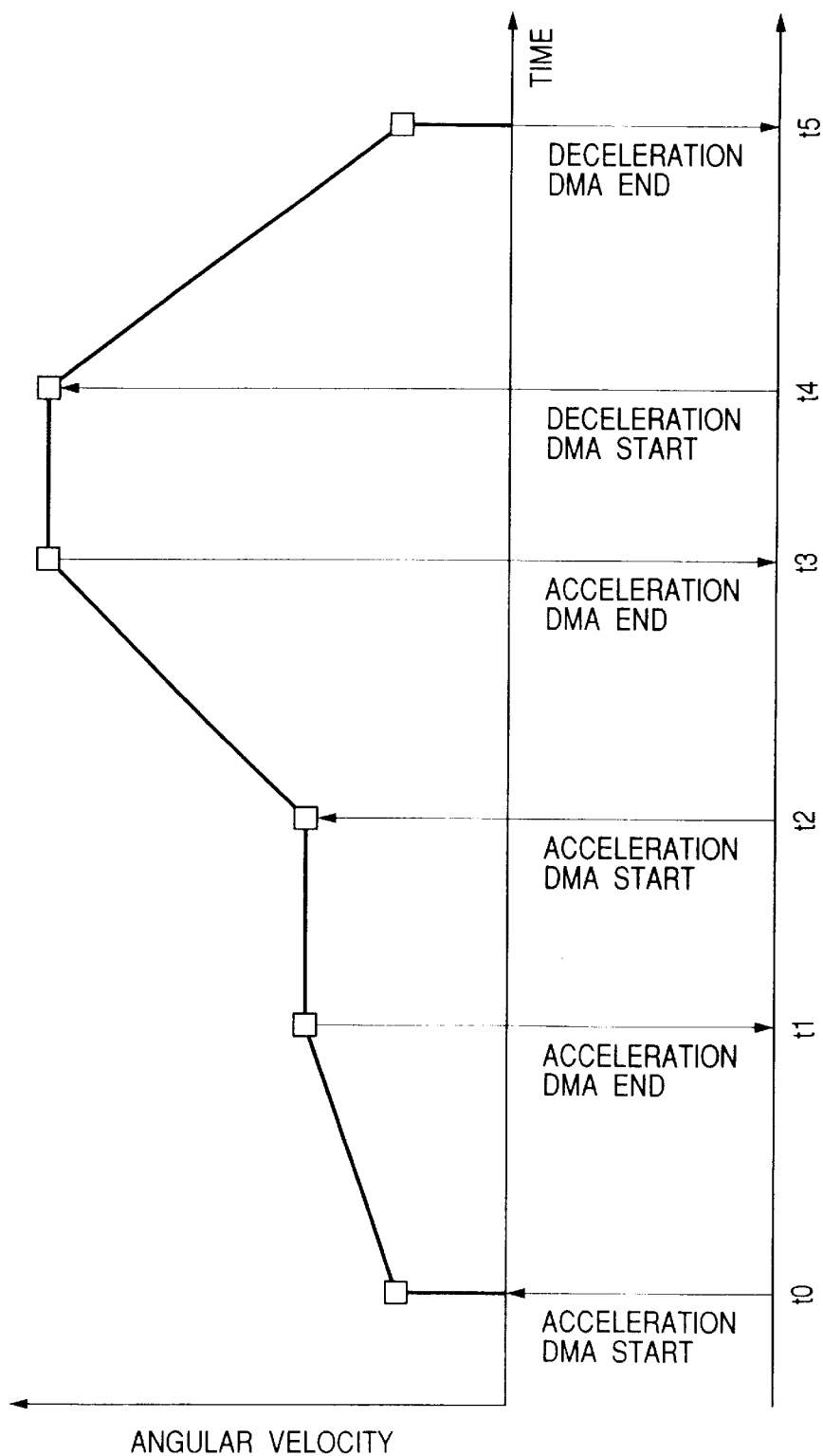
FIG. 6 is a drawing showing another operation example from startup of a motor to stoppage thereof.

FIG. 6 shows a further complicated complex operation. For example, in a printer, etc., a plurality of motors are usually provided in the paper delivery system for the motor control in paper delivery, and in such a configuration, the paper sheet being conveyed might involve the other motors, and thus the motor will be restricted not only by operation specifications of itself but also by the other motors. In such configuration, further complicated operation control as in FIG. 6 should be executed.

For example, in FIG. 6, for acceleration phases of the timing t0 to t1 and t2 to t3, in order to get different acceleration, respectively different velocity data table is used. The reason hereof is that immediately after the start up acceleration is halted at up to an intermediate rotation in relation with the other motors, and moreover the initial acceleration during t0 to t1 must be made low on acceleration speed itself. Thereafter, at the point of time (t2) when a sheet is released from restriction of a slow motor, a high velocity rotation is started up with another velocity table to execute the desired constant speed operation (t3 and onwards) and moreover at the timing t4 and onwards a table for deceleration is used for a halt.

As apparent from what has been described so far, according to the present embodiment, access to the velocity table memory is to be executed by the memory access control portion 1001 independently from control of the CPU 7001 controlling the entire drive control of the motor, and the configuration that the memory access control portion 1001 loads the data read out from the velocity table memory to the time conversion circuit 1002 and moreover urges occurrence of access to the next memory table with the output signals of the time conversion circuit 1002 can control the motor without accompanying the load of the CPU as well as alleviate the load onto the CPU 7001 as an excellent effect.

In addition, the configuration hereof starts memory access from any address inside the velocity table memory with the memory access control portion, finalize at any address, and gives rise to interruption to the CPU controlling the entire system after the access to the memory is finalized, and thereby the load to the CPU can be alleviated.

In addition, in the case where there exist a plurality of motors to be controlled, the memory access is arbitrated so that a plurality of motors can be used the same velocity table memory in common by providing a bus arbitration portion, and also thereby the load to the CPU can be alleviated.

In addition, the phase signal generating portion 1003 is arranged to be configured so as to sequentially switch and output as the motor control signals the contents of the register having length enough to express the combination of phases for controlling the motors, and thereby the load to the CPU can be alleviated.

Second Embodiment

Figure 7:
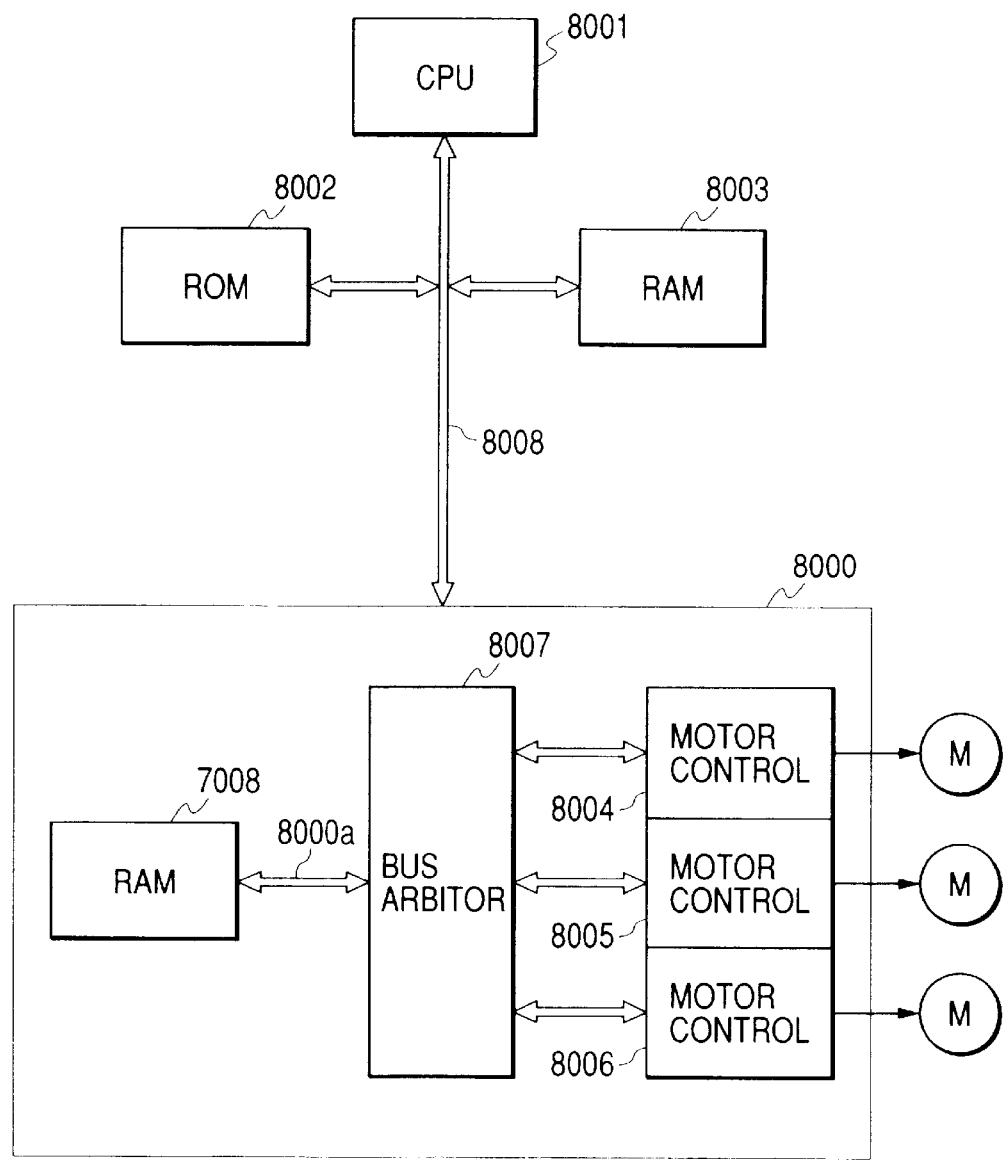
FIG. 7 is a drawing showing a configuration of a second embodiment of a motor control circuit according to the present invention.

FIG. 7 shows entire configuration of a different motor control system according to the present invention. In FIG. 7, which corresponds with the entire configuration in FIG. 1, a RAM 7008 to store a table memory is brought into connection with an exclusive bus 8000a independent from a system bus 8008 at the side of a motor control portion 8000 so that a bus to transfer data of the motor has been caused to get independent from the system bus 8008 at the side of a CPU 8001.

In FIG. 7, reference numeral 8001 denotes a CPU to control a series of operations, and with the system bus 8008 thereof a ROM 8002, in which programs and data are stored, and a RAM 8003 to be used for processing a the CPU 8001 are brought into connection.

On the other hand, reference numerals 8004 to 8006 at the side of the motor control portion 8000 denote motor control blocks respectively equivalent to the motor control block 7004 (or 1000 in FIG. 2). Reference numeral 8007, which denotes a bus arbitration circuit for accessing to a velocity table data from the motor control blocks 8004 to 8006 by DMA transfer, is brought into connection with the RAM 7008 storing the velocity table via the exclusive bus 8000a.

As described so far, the velocity table memory is provided in an exclusive bus independent from the system bus of the CPU in charge of entire control, and thereby the system bus will not be loaded at the time of occurrence of DMA so that the performance of the entire system can be improved compared with the first embodiment.

Respective motor control blocks 7004 to 7006 in FIG. 7 are configured similar to the above described first embodiment, and its internal configuration as well as descriptions on operation is as described above, description thereon will be omitted here.

Incidentally, in an assumption that sizes of the pattern register in the number of phase patterns of the motors to be used are prepared for the first as well as the second embodiment, four bits, that is, four kinds of phase patterns of the motors were adopted in the above described embodiment, but it goes without saying that this bit length may be eight or sixteen and will not limit the present invention any how.

In addition, so far the motors have been described in an assumption that they are used for sheet delivery in printers, etc., but it goes without saying that the motor control according to the present invention will not be limited by members to be driven but can be used to control motors to drive any members to be driven.

As apparent from what has been described so far, in a motor control apparatus to drive-control a motor to be controlled in combination of a plurality of phase signals, adopted is a configuration comprising: a velocity table memory storing velocity data for setting velocity of the above described motor step by step; a memory access control portion to sequentially read out data of said velocity table without being intermediated by control of a CPU controlling the entire drive control of the motor; time conversion means to convert data value read out from the above described velocity table to time data; and a phase signal generating portion to generate phase switching signals to operate the above described motor based on an output of the above described time conversion means, wherein with time data output signals of said the above described time conversion means, occurrence of access to a next memory table toward the above described memory access control portion is urged. That is, access to the velocity table memory is to be executed by the memory access control portion independently from control of the CPU controlling the entire drive control of the motor, and the configuration that the memory access control portion loads the data read out from the velocity table memory to the time conversion circuit and moreover urges occurrence of access to the next memory table with the output signals of the time conversion circuit can control the motor without accompanying the load of the CPU as well as alleviate the load onto the CPU as an excellent effect.

Third Embodiment

Figure 8:
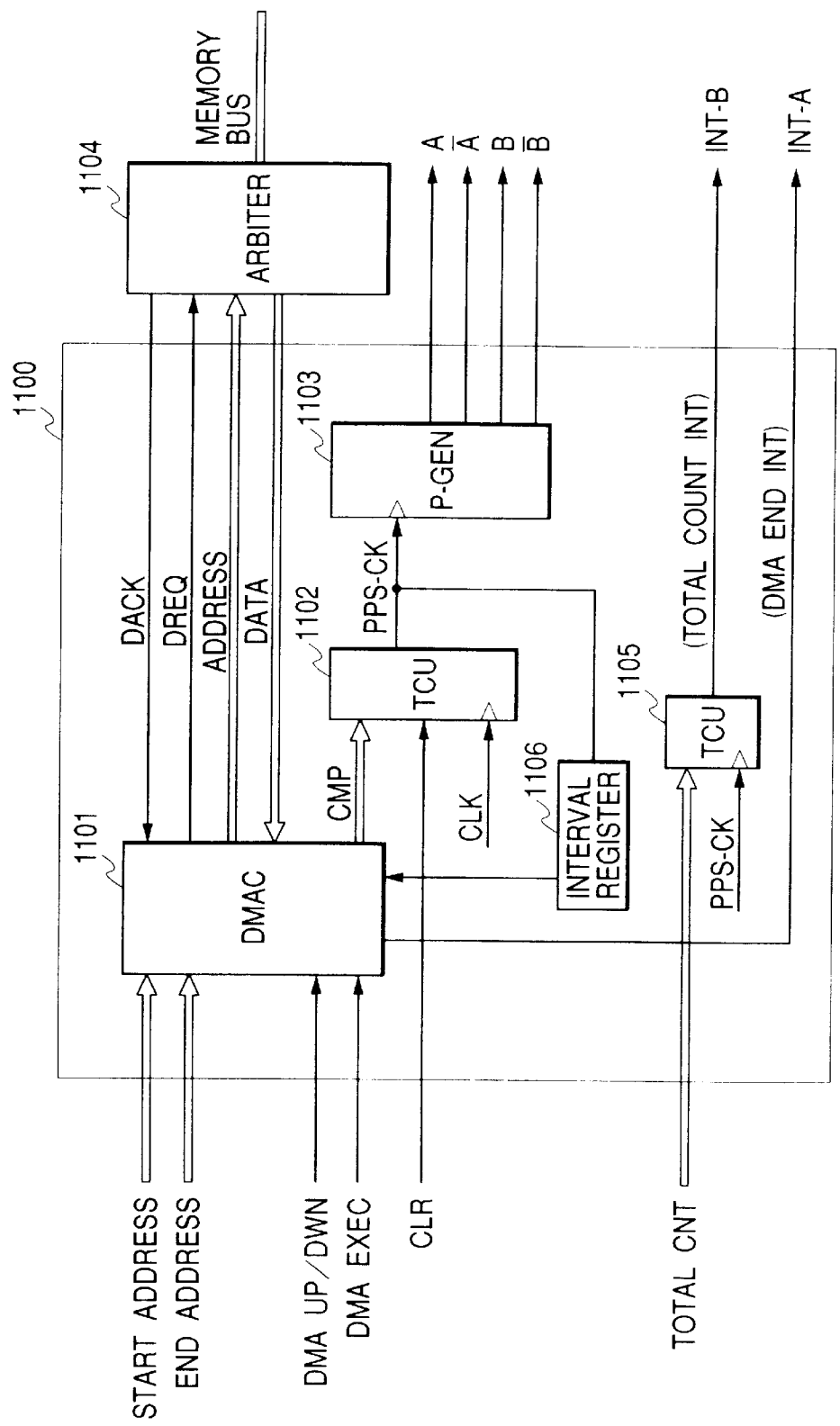
FIG. 8 is a drawing showing another configuration example of a motor control block.

In FIG. 8, another configuration of the motor control blocks 7004 to 7006 in FIG. 1 is detailed.

In FIG. 8, reference numeral 1100 denotes a motor control block equivalent to the motor control blocks 7004 to 7006 in FIG. 1. In FIG. 8, reference numeral 1101 denotes a memory access control portion configured by a DMAC (DMA controller), reference numeral 1102 denotes a timer conversion circuit configured by a timer circuit, 1103 denotes a phase signal generation portion (the detailed configuration thereof to be described later) to generate the phase signal of the motor, the reference numeral 1104 denotes a bus arbitration circuit for accessing to the memory for storing the velocity table (for example, ROM 7002 or RAM 7003 in FIG. 1).

The present embodiment is not lead by the CPU 7001, either as described previously but input and output of the drive data of the motor, that is, the velocity table data, is executed by the motor control block 1100 as well as the bus arbitration circuit 1104.

Reference numeral 1005 denotes a timer circuit to generate interruption at any rotation step to be used for motor drive control of the CPU 7001.

Reference numeral 1106 denotes an interval register to control when to request the memory access circuit in 1101 to start the DMA in receipt of signals from the time conversion circuit configured by the timer circuit 1102 for how many times.

That is, in the present embodiment, the memory access control portion 1101 loads a time conversion circuit 1102 from data read in from the velocity table memory sequentially via the bus arbitration circuit 1104 ("CMP" signal) generates "PPS-CLK" signals and generates phase switching signals to the phase signal generating portion 1103 every time when the time conversion circuit 1102 finalizes clocking.

In addition, when the subsequent data read-in is urged to the memory access control portion 1101, the interval register 1106 is enacted so as to mask the requests to the memory access control portion 1101 up to a number of times set in the interval register 1106. Thereby, the same drive data will become usable for a plurality of times so as to enable the memory capacity for storing the motor velocity table to be reduced.

As described above, the velocity table storage memory in Table 1 starts in the address 100 and continues up to the address 162, and the data in the right end in the table are stored in each address. The left side of the table dose not show the data actually stored, but shows actual accumulated drive time, control velocity (PPS), acceleration (PPS/ms) and drive time (m/s) corresponding with respective data in a drive system. In this example, the motor is controlled to give the initial velocity of 220 PPS and so as to finally reach 2941 PPS.

Table 1 is exemplified by a table in which all the data under a constant drive control condition have been arranged, but as apparent from Table 1, in the data of this table, almost all the adjacent data (time values) are the same or extremely approximate each other. Accordingly, with the value of the previous interval register 1106 being 2, masking is arranged so as that the DMA request takes place when the same data are used twice, and then the time data covering only twice to be stored in the table will do so as to be capable of alleviating the table memory capacity.

Next, the operation in the configuration described so far will be described in detail.

In the case where the motor starts up with the CPU 7001 in FIG. 1, the drive data are to be loaded in the velocity table storing memory. In this case, as described above, in an assumption of control of the interval register 1106, data each one of which can be used twice (or a number of times corresponding with a set value of the interval register) are prepared in advance and this shall be used.

For example, Table 2 shows an example of a velocity table usable for the configuration in FIG. 8. This velocity table is an example of a velocity table to execute acceleration from 96 PPS to 612 PPS in 11 STEP, which can be used by storing "2" into the interval register 1006. An acceleration characteristic graph in case of using the velocity table in Table 2 is shown in FIG. 9.

Figure 9:
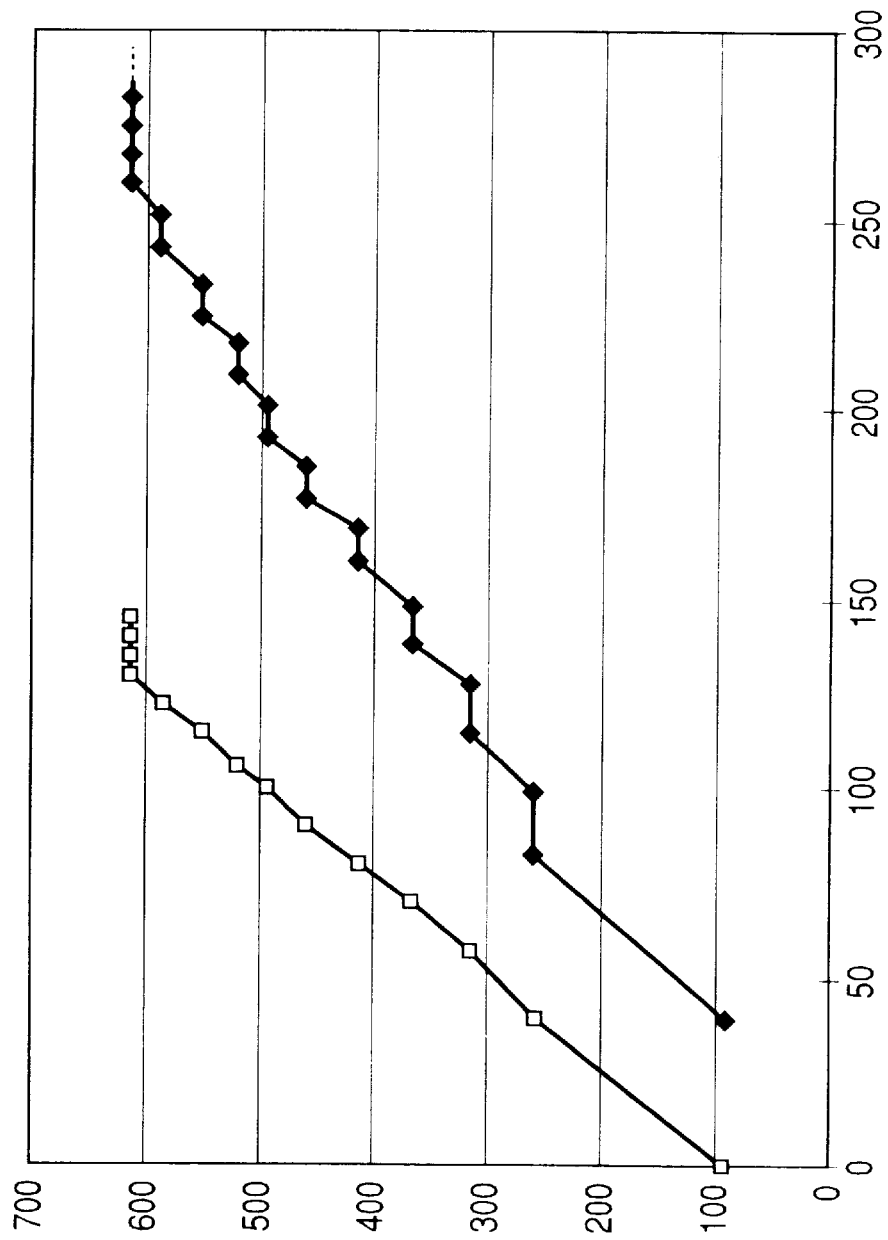
FIG. 9 is a drawing showing motor acceleration characteristics when an interval register is used.

The graph dotted by white squares in FIG. 9 represents an operation in the case where the motors are driven with the data in Table 2 without the control of the interval register 1106 while the graph dotted by black ones does an operation in the case where the motors are driven with the control of the interval register 1106 in the present embodiment. In FIG. 9, it is apparent that the same data are used twice each for all the phase switching (except the phase switching for the first time).

Accordingly, according to controlling of the present embodiment, compared with a prior art method executing control of the same resolution capability the memory capacity necessary for the velocity table can be reduced by approximately a half.

Incidentally, the accumulation drive time having been shown in Table 2 shows that in the case where the motors are driven without control of the interval register 1106, and the actual accumulation drive time is twice as that in Table 2 as shown in FIG. 9. In addition, due to the same reason, acceleration has been reduced by half in FIG. 9. Accordingly, in the case where the motors are actually controlled with configuration in FIG. 8, it is necessary to prepare respective data so as to satisfy the actually required accumulation drive time as well as acceleration corresponding with the values to be given to this interval register 1106.

Now, suppose that the velocity table described above is prepared, at first the CPU sets a start address (START ADDRESS in FIG. 8) and an end address (END ADDRESS in FIG. 8) in the memory access control portion 1101.

Subsequently, the memory access control portion 1101 outputs "DREQ" signals being address signals and request signals to the bus arbitration circuit 1104 in order to read data of the first address (for example, the address 100 in Table 1).

Thereby, the bus arbitration circuit 1104 executes timing arbitration with the memory access request from another motor control portion so as to output data to the memory access control portion 1101 when data of the requested address is read in and output the signal "DACK" to notify of confirmation on the data.

Thereby, the memory access control portion 1101 outputs the read-in velocity table data as "CMP" signals to a time conversion circuit 1102 comprising a timer circuit.

Thereafter, the stage goes forward to the timing to operate the motor actually, the "CLR" signal is set OFF toward the time conversion circuit 1102, and the "DMA-EXEC" signals meaning a start is inputted to the memory access control portion 1101.

Thereby, when an internal counter of the time conversion circuit 1102 operates to reach the value inputted by the "CMP" signal, the signal "PPS-CLK" is inputted to the phase signal generation portion 1103. This signal "PPS-CLK" is also inputted to the memory access control portion 1101 via the interval register 1106, but as described above, the interval register 1106 operates so as to input the signal "PPS-CLK" to the memory access control portion 1101 once in every one or more times.

That is, if "2" is set in the interval register 1106, output of "PPS-CLK" to the memory access circuit 1101 is permitted to go forward to the next table data when the PPS to 1101 takes place twice, for example, and thus the times of occurrence of DMA for the times of occurrence of "PPS-CLK" is controlled.

That is, in the case where the input to the memory access circuit 1101 of the "PPS-CLK" is masked with the interval register 1106, the next "PPS-CLK" takes place at a timing created by the table data as in the previous time.

In addition, when the interval register 1106 outputs the "PPS-CLK" to the memory access circuit 1101 for the second time, then at this time, the memory access control portion 1101 inputs as the "CMP" signal the value read in with the memory access for the second time to the time conversion circuit 1102 with the input of the "PPS-CLK", and also outputs a signal predetermined by the bus arbitration circuit 1104 in order to proceed with memory access for the third time.

The above described operation is continued so that "PPS-CLK" being the phase switching signal is generated based on the velocity table in Table 2, at last reaches the address of that table memory, and the value of PPS reaches 612 PPS, at that point of time, the memory access control portion of 1101 finalizes memory access then and onward, outputs "DMA-END" being an interrupting signal to show that the acceleration operation of the motor is finalized, and notifies the CPU 7001 accordingly. In addition, the TCU 1105 notifies the CPU of the fact that the motor has gone ahead by any rotational angel from any point of time while the CPU 7001 executes a predetermined motor control based on the notified rotational angle.

As described so far, based on the velocity table, the occurrence interval of the "PPS-CLK" is controlled to get gradually shorter and thus the motor can be accelerated.

As apparent from what has been described so far, according to the present embodiment, access to the velocity table memory is to be executed by the memory access control portion 1101 independently from control of the CPU 7001 controlling the entire drive control of the motor, and thus, in addition to that a load to the CPU 7001 can be alleviated, since the data read out from the velocity table memory is loaded onto the time conversion circuit 1102 and moreover following the interval register 1106, occurrence of access to the next memory table is arranged to be urged, in addition to that a load to the CPU can be alleviated, a plurality of acceleration-deceleration patterns can be created from a single table so that the memory capacity necessary for the above described velocity table memory can be reduced largely as an excellent effect.

In addition, in the case where there exist a plurality of motors to be controlled, the memory access is arbitrated so that a plurality of motors can use the same velocity table memory in common by providing a bus arbitration portion, and also thereby the load to the CPU can be alleviated.

In addition, the phase signal generating portion 1103 is arranged to be configured so as to sequentially switch and output as the motor control signals the contents of the register having length enough to express the combination of phases for controlling the motors, and thereby the load to the CPU can be alleviated.

As apparent from what has been described so far, in a motor control apparatus to drive-control a motor to be controlled in combination of a plurality of phase signals, a configuration is adopted so as to comprise: a velocity table memory storing velocity data for setting velocity of the above described motor step by step; a memory access control portion to sequentially read out data of said velocity table without being intermediated by control of a CPU controlling the entire drive control of the motor; time conversion means to convert data value read out from the above described velocity table to time data; a phase signal generating portion to generate phase switching signals to operate the above described motor based on an output of the above described time conversion means; and interval control means to urge the above described memory access control portion to give rise to occurrence of access to a next memory table in a number of predetermined times of time data output of the above described time conversion means and to control the above described time conversion means so as to operate with same data values read out from the above described velocity table up to then. That is, access to the above described velocity table memory is to be executed by the memory access control portion independently from control of the CPU controlling the entire drive control of the motor, and thus, in addition to that a load to the CPU can be alleviated, since the data read out from the above described velocity table memory is loaded onto the above described time conversion means and moreover following the interval control means, occurrence of access to the next memory table is arranged to be urged, in addition to that a load to the CPU can be alleviated, a plurality of acceleration-deceleration patterns can be created from a single table so that the memory capacity necessary for the above described velocity table memory can be reduced largely as an excellent effect.

Fourth Embodiment

Figure 10:
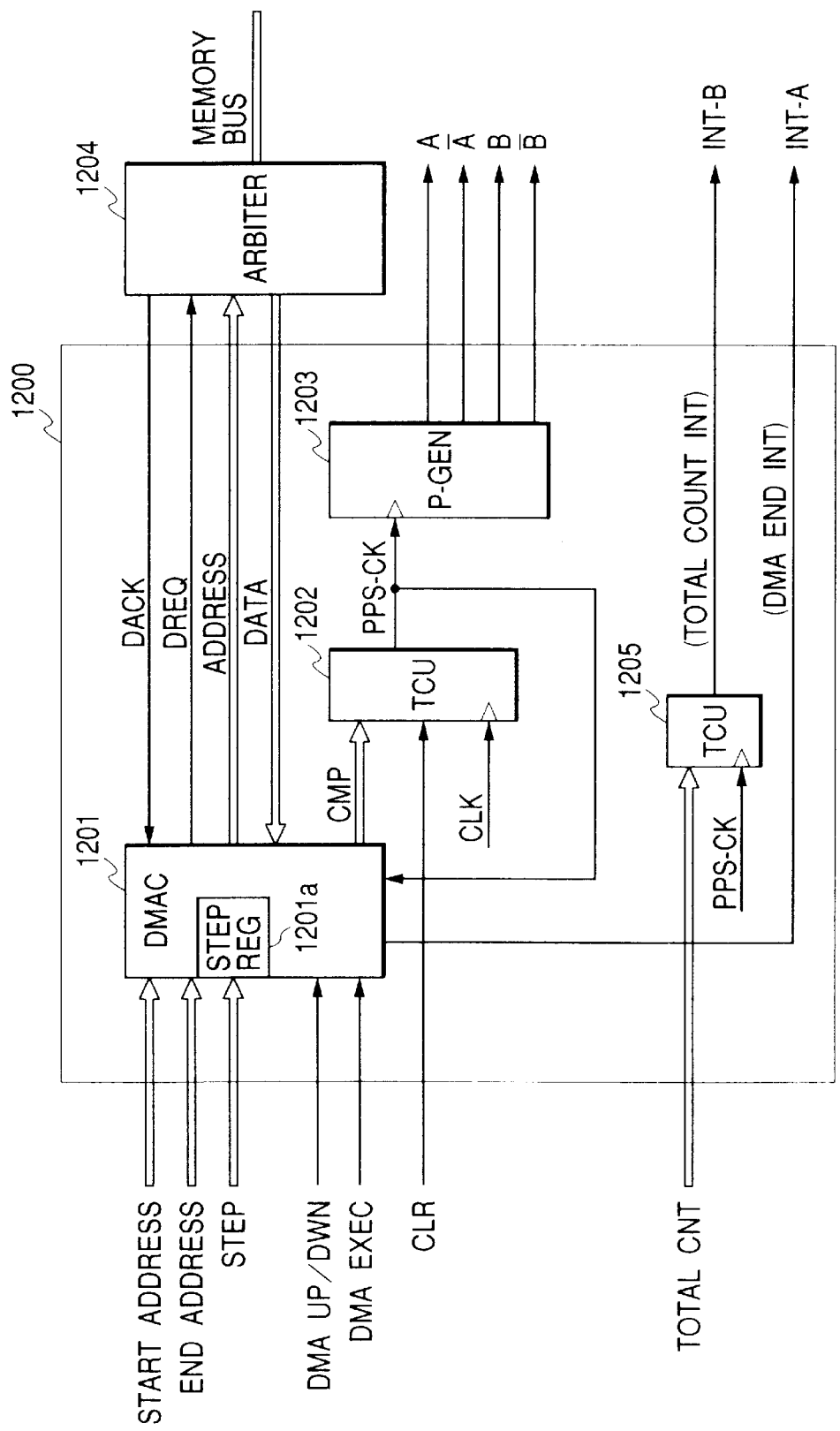
FIG. 10 is a drawing showing still another configuration example of a motor control block.

In FIG. 10, another configuration of the motor control blocks 7004 to 7006 in FIG. 1 is detailed. In FIG. 1, reference numeral 1000 denotes a motor control block equivalent to the motor control blocks 7004 to 7006 in FIG. 7.

In FIG. 10, reference numeral 1201 denotes a memory access control portion configured by a DMAC (DMA controller), reference numeral 1202 does a timer conversion circuit configured by a timer circuit, 1203 does a phase signal generating portion (the detailed configuration thereof to be described later) to generate the phase signals of the motor, the reference numeral 1204 denotes a bus arbitration circuit for accessing to the memory for storing the velocity table (for example, ROM 7002 or RAM 7003 in FIG. 1).

Reference numeral 1205 denotes a timer circuit to generate interruption at any rotation step to be used for motor drive control of the CPU 7001.

The present embodiment is not lead by the CPU 7001, either as in the above described embodiment, but input and output of the drive data of the motor, that is, the velocity table data, is executed by the motor control block 1200 as well as the bus arbitration circuit 1204.

In the present embodiment, the memory access control portion 1201 configured by DMAC (DMA controller) accesses to the velocity table memory via the bus arbitration circuit 1204 and readouts the velocity data, but at the time, a start address (START ADDRESS in FIG. 10) and an end address (END ADDRESS in FIG. 10) are set in the memory access control portion 1201 and a signal "DMA EXEC" is given thereto so that the data of the velocity table can be read out from a particular address.

In addition, in the present embodiment, the memory access control portion 1201 further has a step register 1201a, and any step quantity is given by the "STEP" signal from the CPU 7001 to this step register 1201a so that the alteration step of the address reading out the data from the velocity table can be determined.

Incidentally, the memory access control portion 1201 should have a limit function to finalize the DMA transfer with the step of the table address by the step register 1201a in the end address (finalization address) in the case where the initially set end address is past.

In the present embodiment, with the step register 1201a as described above, different data patterns can be read out from the same velocity pattern, and giving rise to the same effect as in case of string a plurality of acceleration-deceleration patterns in a signal velocity table, alleviating the load onto the CPU as well as creating a plurality of acceleration-deceleration patterns from a signal velocity table so as to enable the memory capacity necessary for the velocity table to be reduced largely. The memory can be economized.

As in the above described embodiment, the velocity table storage memory in Table 1 starts in the address 100 and continues up to the address 162, and the data in the right end in the table are stored in each address. The left side of the table dose not show the data actually stored, but shows actual accumulated drive time, control velocity (PPS), acceleration (PPS/ms) and drive time (m/s) corresponding with respective data in a drive system. In this example, the motor is controlled to give the initial velocity of 220 PPS and so as to finally reach 2941 PPS.

Table 1 is exemplified by a table in which all the data under a constant drive control condition have been arranged, and it will be made apparent by this table that completely different acceleration-deceleration characteristics will be given if the data are read out in every other datum, for example, with the step register 1201a of the above described memory access control portion 1201.

Figure 11:
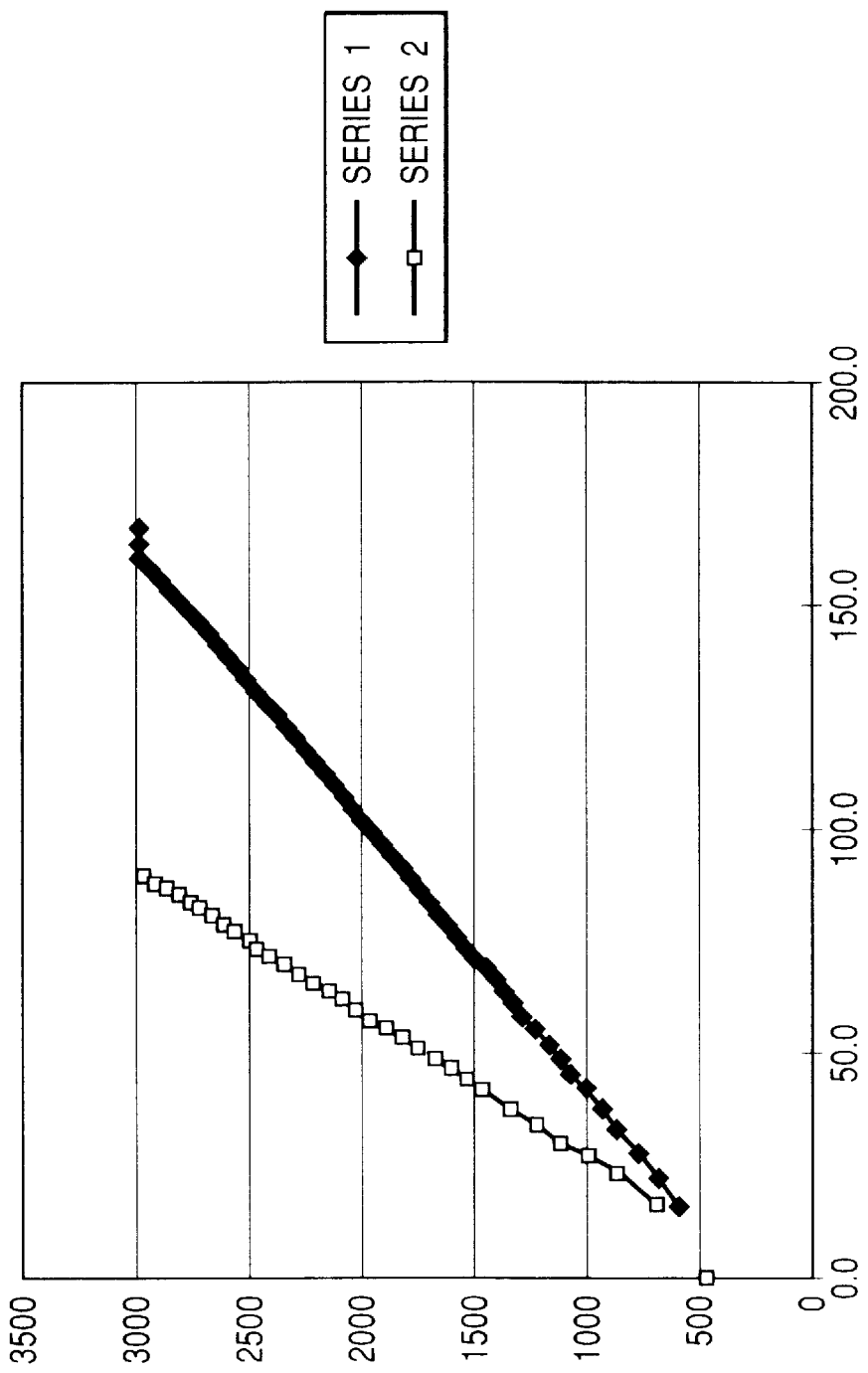
FIG. 11 is a drawing showing motor acceleration characteristics when a step register is used.

For example, FIG. 11 shows a graph on the acceleration characteristics obtainable in case of reading out the velocity data with different step quantities from the table in Table 1 with the step register 1201a. "Series 1" in FIG. 11 shows the case with 1 being the step quantity of the DMA by way of setting of the step register 1201a of the memory access control portion 1201 (summing the address sequentially one by one while "series 2" shows the acceleration characteristics in case of 2 being the step quantity of the DMA (that is, reading the address of the table memory every other datum).

Thus, according to the present embodiment, the operation of the step register 1201a of the memory access control portion 1201 can give rise to an effect as in case of storing a plurality of acceleration-deceleration patterns in a signal velocity table and can reduce the capacity of the table memory.

Next, the operation in the configuration described so far will be described in detail.

In the case where the motor starts up with the CPU 7001 in FIG. 1, the drive data are to be loaded in the velocity table storing memory in advance. The velocity table memory at this time shall store the data as shown in Table 1.

Incidentally, should the velocity table as described above be prepared, at first the CPU sets a start address (START ADDRESS in FIG. 10) and an end address (END ADDRESS in FIG. 10) in the memory access control portion 1201. In addition, with the signal "STEP", the step quantity of the address at the time to read out the table is set.

Subsequently, the memory access control portion 1201 outputs "DREQ" signals being address signals and request signals to the bus arbitration circuit 1204 in order to read data of the first address (for example, the address 100 in Table 1).

Thereby, the bus arbitration circuit 1204 executes timing arbitration with the memory access request from another motor control portion so as to output data to the memory access control portion 1201 when data of the requested address is read in and output the signal "DACK" to notify of confirmation on the data.

Thereby, the memory access control portion 1201 outputs the read-in velocity table data as "CMP" signals to a time conversion circuit 1202 comprising a timer circuit.

Thereafter, the stage goes forward to the timing to operate the motor actually, the "CLR" signal is set OFF toward the time conversion circuit 1202, and the "DMA-EXEC" signals meaning a start is inputted to the memory access control portion 1201.

Thereby, when an internal counter of the time conversion circuit 1202 operates to reach the value inputted by the "CMP" signal, the signal "PPS-CLK" is inputted to the phase signal generating portion 1203. This signal "PPS-CLK" is also inputted to the memory access control portion 1201 so that the memory access control portion 1201 proceeds with reading out the next data, taking the opportunity of input of this signal "PPS-CLK". At that time, the address of the velocity table memory to subsequently execute reading out corresponding with setting by the step register 1201a is determined and that address is inputted to the bus arbitration circuit 1204.

The above described operation is continued so that "PPS-CLK" being the phase switching signal is generated based on the velocity table in Table 1, at last reaches the address of that table memory, and the value of PPS reaches the velocity of 2941, at that point of time, the memory access control portion 1201 finalizes memory access then and onward, outputs "DMA-END" being an interrupting signal to show that the acceleration operation of the motor is finalized, and notifies the CPU 7001 accordingly. In addition, the TCU 1205 notifies the CPU of the fact that the motor has gone ahead by any rotational angle from any point of time while the CPU 7001 executes a predetermined motor control based on the notified rotational angle.

As described so far, based on the velocity table, the occurrence interval of the "PPS-CLK" is controlled to get gradually shorter and thus the motor can be accelerated. At that time, as having been shown in FIG. 11, setting by way of the step register 1201a of the memory access control portion 1201 can avail different acceleration characteristics. That is, according to the present embodiment, an effect as in case of storing a plurality of acceleration patterns in a signal velocity table can be given rise to and the capacity of the table memory can be reduced.

Figure 12:
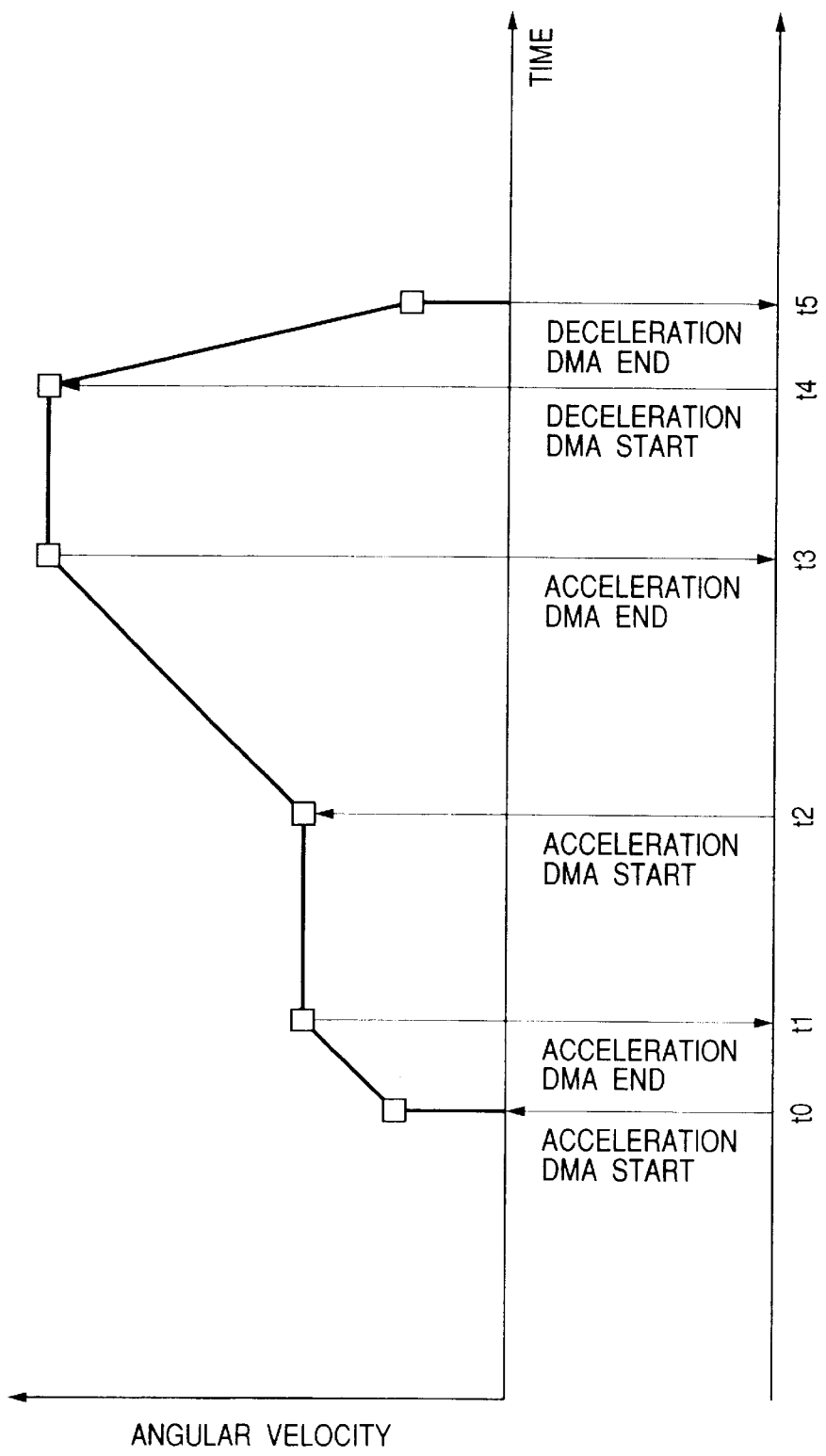
FIG. 12 is a drawing showing still another operation example from startup of a motor to stoppage thereof.
Figure 13:
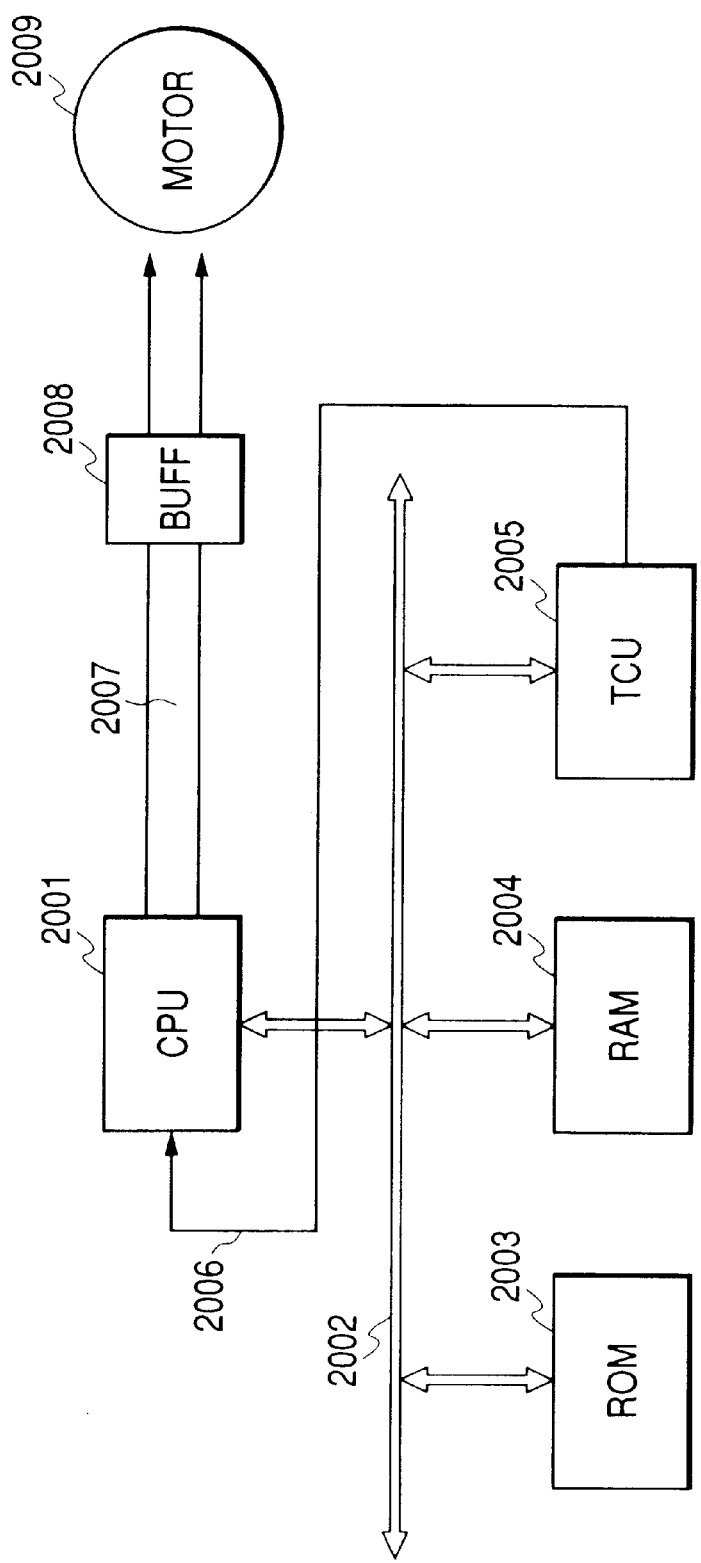
FIG. 13 is a drawing showing an entire configuration of a prior art motor control system.
Figure 14:
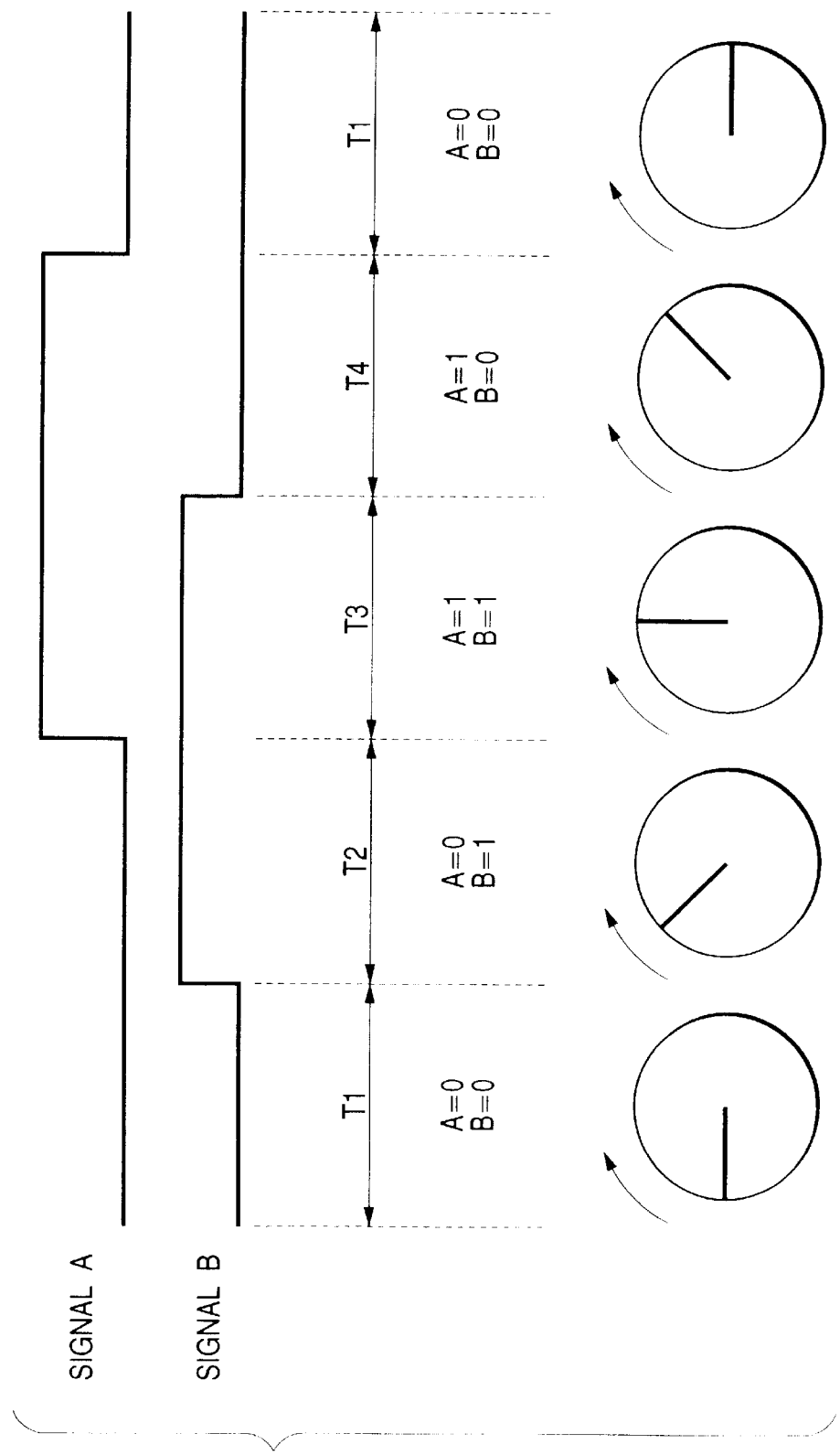
FIG. 14 is an explanatory view showing a driving principle of a motor.
Figure 15:
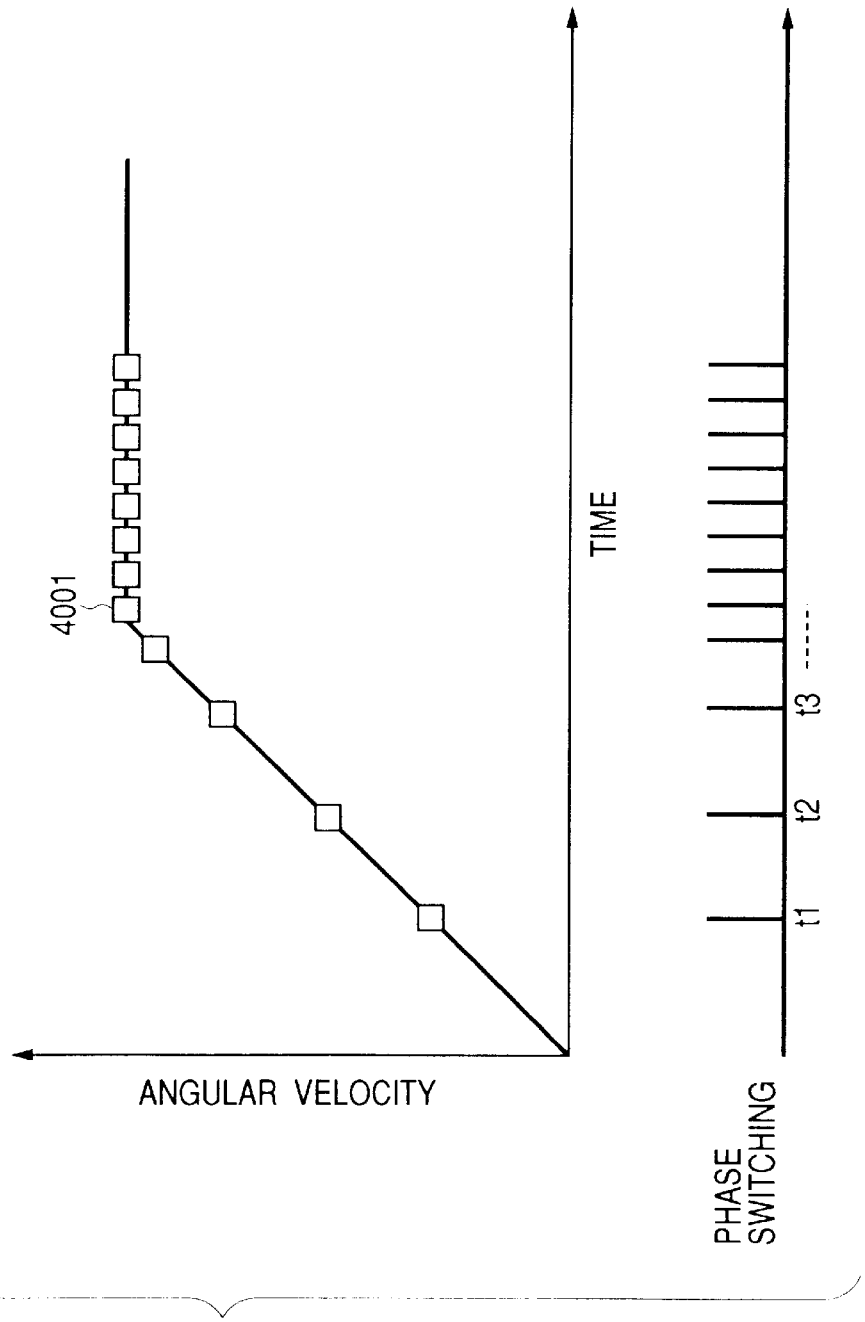
FIG. 15 is an explanatory view showing a summary of motor acceleration operation.

A driving example on a motor is shown in FIG. 12.

In FIG. 12, for acceleration phases of the timing t0 to t1 and t2 to t3, in order to get different acceleration, respectively different velocity data table is used. The reason hereof is that acceleration is halted at up to an intermediate rotation in relation with the other motors immediately after starting up, and moreover the initial acceleration during t0 to t1 must be made low on acceleration speed itself. Thereafter, at the point of time (t2) when a sheet is released from restriction of a slow motor, a high velocity rotation is started up with another acceleration to execute the desired constant speed operation (t3 and onwards).

In addition, at the time of a halt (t4 to t5), with the table in which the velocity data for deceleration are stored, a progressing amount of the step register 1201a is made large with the above described control so that deceleration can be executed in a short time. Or, if acceleration needs to be adjusted also at the time of the above described two-stage acceleration, different step quantities may be arranged to be given to different step registers 1201a in respective periods of timing t0 to t1 and timing t2 to t3.

As apparent from what has been described so far, according to the present embodiment, such configuration that the memory access control portion 1201 is provided with the step register 1201a for setting any variation amount to the read-out address at the time when the velocity table data are sequentially read out is adopted so that the velocity of the motor can be controlled only by hardware without accompanying the load onto the CPU, and moreover, setting the step quantity of the address to the step register 1201a can give different acceleration-deceleration characteristics from one velocity table. That is, according to the present embodiment, an effect as in case of storing a plurality of acceleration patterns in a signal velocity table can be given rise to and the capacity of the table memory can be reduced.

In addition, controlling the read-out address by the step register 1201a, a limit function is provided so as to finalize reading out the velocity table in the initially set finalization address in case of passing the finalization address on reading out the velocity table initially set in the memory access control portion 1201, and therefore, the control system can set any step quantity corresponding with necessity so as not to cause any operation error in access to a region other than a predetermined region in the memory.

Moreover, in the case where there exist a plurality of motors to be controlled, the memory access is arbitrated so that a plurality of motors can use the same velocity table memory in common by providing a bus arbitration portion, and also thereby the load to the CPU can be alleviated.

In addition, the phase signal generating portion 1203 is arranged to be configured so as to sequentially switch and output as the motor control signals the contents of the register having length enough to express the combination of phases for controlling the motors, and thereby the load to the CPU can be alleviated.

As apparent from what has been described so far, adopted is a configuration of a motor control apparatus to drive-control a motor to be controlled in combination of a plurality of phase signals, comprising: a velocity table memory storing velocity data for setting velocity of the above described motor step by step; a memory access control portion to sequentially read out data of said velocity table without being intermediated by control of a CPU controlling the entire drive control of the motor; time conversion means to convert data value read out from the above described velocity table to time data; a phase signal generating portion to generate phase switching signals to operate the above described motor based on an output of the above described time conversion means; and a step register to set any variation amount to a read-out address when said memory access control portion sequentially reads out data of said velocity table. That is, without accompanying the load onto the CPU controlling the entire operations, the velocity of the motor can be controlled only by hardware, and moreover setting the step quantity of the address to the step register 1201a can give different acceleration characteristics from one velocity table, and an effect as in case of storing a plurality of acceleration patterns in a signal velocity table can be given rise to and the capacity of the table memory can be reduced as an excellent effect.

So far, the present invention has been described with several preferred embodiment configurations, but the present invention shall not be limited hereto, but various kinds of variations and alterations are possible within the range of claims.

TABLE 1

| Accumulated drive time | Control velocity (PPS) | Acceleration (PPS/ms) | Drive time (ms) | Address | Data |
|---|---|---|---|---|---|
| 0.0 | 220 | 16.9 | 18.182 | 100 | 214 |
| 18.2 | 528 | 17.0 | 7.576 | 101 | 89 |
| 25.8 | 657 | 16.9 | 6.088 | 102 | 72 |
| 31.8 | 760 | 17.1 | 5.263 | 103 | 62 |
| 37.1 | 850 | 17.0 | 4.706 | 104 | 55 |
| 41.8 | 930 | 17.0 | 4.301 | 105 | 51 |
| 46.1 | 1003 | 17.1 | 3.988 | 106 | 47 |
| 50.1 | 1071 | 16.9 | 3.735 | 107 | 44 |
| 53.8 | 1134 | 17.0 | 3.527 | 108 | 41 |
| 57.4 | 1194 | 17.0 | 3.350 | 109 | 39 |
| 60.7 | 1251 | 16.9 | 3.197 | 110 | 38 |
| 63.9 | 1305 | 17.0 | 3.065 | 111 | 36 |
| 67.0 | 1357 | 17.3 | 2.948 | 112 | 35 |
| 69.9 | 1408 | 16.9 | 2.841 | 113 | 33 |
| 72.8 | 1456 | 17.1 | 2.747 | 114 | 32 |
| 75.5 | 1503 | 16.9 | 2.661 | 115 | 31 |
| 78.2 | 1548 | 17.0 | 2.584 | 116 | 30 |
| 80.8 | 1592 | 17.1 | 2.513 | 117 | 30 |
| 83.3 | 1635 | 16.8 | 2.446 | 118 | 29 |
| 85.7 | 1676 | 17.2 | 2.387 | 119 | 28 |
| 88.1 | 1717 | 16.7 | 2.330 | 120 | 27 |
| 90.4 | 1756 | 17.1 | 2.278 | 121 | 27 |
| 92.7 | 1795 | 17.1 | 2.228 | 122 | 26 |
| 94.9 | 1833 | 17.0 | 2.182 | 123 | 26 |
| 97.1 | 1870 | 16.8 | 2.139 | 124 | 25 |
| 99.3 | 1906 | 17.2 | 2.099 | 125 | 25 |
| 101.4 | 1942 | 17.0 | 2.060 | 126 | 24 |
| 103.4 | 1977 | 17.3 | 2.023 | 127 | 24 |
| 105.4 | 2012 | 16.6 | 1.988 | 128 | 23 |
| 107.4 | 2045 | 17.4 | 1.956 | 129 | 23 |
| 109.4 | 2079 | 16.6 | 1.924 | 130 | 23 |
| 111.3 | 2111 | 17.4 | 1.895 | 131 | 22 |
| 113.2 | 2144 | 16.6 | 1.866 | 132 | 22 |
| 115.1 | 2175 | 16.9 | 1.839 | 133 | 22 |
| 116.9 | 2206 | 17.6 | 1.813 | 134 | 21 |
| 118.7 | 2238 | 16.2 | 1.787 | 135 | 21 |
| 120.5 | 2267 | 17.0 | 1.764 | 136 | 21 |
| 122.3 | 2297 | 17.2 | 1.741 | 137 | 20 |
| 124.0 | 2327 | 17.5 | 1.719 | 138 | 20 |
| 125.7 | 2357 | 16.5 | 1.697 | 139 | 20 |
| 127.4 | 2385 | 17.3 | 1.677 | 140 | 20 |
| 129.1 | 2414 | 16.9 | 1.657 | 141 | 19 |
| 130.8 | 2442 | 17.1 | 1.638 | 142 | 19 |
| 132.4 | 2470 | 16.7 | 1.619 | 143 | 19 |
| 134.0 | 2497 | 17.5 | 1.602 | 144 | 19 |
| 135.6 | 2525 | 17.0 | 1.584 | 145 | 19 |
| 137.2 | 2552 | 16.6 | 1.567 | 146 | 18 |
| 138.8 | 2578 | 17.4 | 1.552 | 147 | 18 |
| 140.3 | 2605 | 16.9 | 1.536 | 148 | 18 |
| 141.9 | 2631 | 16.4 | 1.520 | 149 | 18 |
| 143.4 | 2656 | 17.3 | 1.506 | 150 | 18 |
| 144.9 | 2682 | 17.4 | 1.491 | 151 | 18 |
| 146.4 | 2708 | 16.9 | 1.477 | 152 | 17 |
| 147.9 | 2733 | 16.4 | 1.464 | 153 | 17 |
| 149.3 | 2757 | 17.2 | 1.451 | 154 | 17 |

TABLE 1-continued

| Accumulated drive time | Control velocity (PPS) | Acceleration (PPS/ms) | Drive time (ms) | Address | Data |
|---|---|---|---|---|---|
| 150.8 | 2782 | 17.4 | 1.438 | 155 | 17 |
| 152.2 | 2807 | 16.8 | 1.425 | 156 | 17 |
| 153.6 | 2831 | 17.0 | 1.413 | 157 | 17 |
| 155.1 | 2855 | 16.4 | 1.401 | 158 | 16 |
| 156.5 | 2878 | 16.5 | 1.390 | 159 | 16 |
| 157.8 | 2901 | 17.4 | 1.379 | 160 | 16 |
| 159.2 | 2925 | 11.7 | 1.368 | 161 | 16 |
| 160.6 | 2941 | 0.0 | 1.360 | 162 | 16 |

TABLE 2

| Accumulated drive time | Control PPS | Acceleration | Drive time |
|---|---|---|---|
| 0.0 | 96 | 4.0 | 41.7 |
| 41.7 | 263 | 4.0 | 15.2 |
| 56.9 | 324 | 4.1 | 12.3 |
| 69.2 | 374 | 4.0 | 10.7 |
| 79.9 | 417 | 4.1 | 9.6 |
| 89.5 | 456 | 4.0 | 8.8 |
| 98.3 | 491 | 4.1 | 8.1 |
| 106.4 | 524 | 4.1 | 7.6 |
| 114.1 | 555 | 4.0 | 7.2 |
| 121.3 | 584 | 4.1 | 6.8 |
| 128.1 | 612 | 0.0 | 6.5 |
| 134.7 | 612 | 0.0 | 6.5 |
| 141.2 | 612 | 0.0 | 6.5 |
| 147.7 | 612 | 0.0 | 6.5 |

What is claimed is:

1. A motor control apparatus to drive-control a motor in a combination of a plurality of phase signals, comprising:
   a velocity table memory for storing velocity data for setting a velocity of the motor step by step;
   a CPU for controlling a drive control of the motor, said CPU outputting a start signal to start reading out velocity data from said velocity table memory;
   a memory access control portion for inputting the start signal output by said CPU and for sequentially reading out velocity data stored in a plurality of addresses from said velocity table memory without depending on any instruction from said CPU, after said memory access control portion inputs the start signal output by said CPU;
   a time conversion portion for converting velocity data read out from said velocity table memory by control of said memory access control portion to time data; and
   a phase signal generating portion for generating phase switching signals to operate the motor based on an output of said time conversion portion.

2. The motor control apparatus according to claim 1, wherein said memory access control portion starts memory access at any address inside said velocity table memory to end at any address, and an interruption to said CPU controlling a series operation occurs after said memory access control portion ends memory access.

3. The motor control apparatus according to claim 1, wherein said memory access control portion comprises a bus arbitration portion to access said velocity table memory to drive-control a plurality of motors.

4. The motor control apparatus according to claim 1, wherein said phase signal generating portion sequentially switches and outputs as motor control signals contents of a register having bit width enough to be capable of expressing a combination of phases for controlling motors.

5. A motor control apparatus to drive-control a motor in a combination of a plurality of phase signals, comprising:
   a velocity table memory for storing velocity data for setting a velocity of the motor step by step;
   a CPU for controlling a drive control of the motor, said CPU outputting a start signal to start reading out velocity data from said velocity table memory;
   a memory access control portion for inputting the start signal output by said CPU and for sequentially reading out velocity data stored in a plurality of addresses from said velocity table memory without depending on any instruction from said CPU, after said memory access control portion inputs the start signal output by said CPU;
   a time conversion portion for converting velocity data read out from said velocity table memory by control of said memory access control portion to time data; and
   a phase signal generating portion for generating phase switching signals to operate the motor based on an output of said time conversion portion; and
   a control portion for controlling said time conversion portion so that velocity data that corresponds to the time data is read out from said velocity table memory until an output of said time conversion portion reaches a predetermined time.

6. The motor control apparatus according to claim 5, wherein said memory access control portion starts memory access at any address inside said velocity table memory to end at any address, and an interruption to said CPU controlling a series operation occurs after said memory access control portion ends memory access.

7. The motor control apparatus according to claim 5, wherein said memory access control portion comprises a bus arbitration portion to access a velocity table memory to drive-control a plurality of motors.

8. The motor control apparatus according to claim 5, wherein said phase signal generating portion sequentially switches and outputs as motor control signals contents of a register having bit width enough to be capable of expressing a combination of phases for controlling motors.

9. A motor control apparatus to drive-control a motor in a combination of a plurality of phase signals, comprising:
   a velocity table memory for storing velocity data for setting a velocity of the motor step by step;
   a CPU for controlling a drive control of the motor, said CPU outputting a start signal to start reading out velocity data from said velocity table memory;
   a memory access control portion for inputting the start signal output by said CPU and for sequentially reading out velocity data stored in a plurality of addresses from said velocity table memory without depending on any instruction from said CPU, after said memory access control portion inputs the start signal output by said CPU;
   a time conversion portion for converting velocity data read out from said velocity table memory by control of said memory access control portion to time data; and
   a phase signal generating portion for generating phase switching signals to operate the motor based on an output of said time conversion portion; and
   a register for setting a skip amount to a read-out address when said memory access control portion sequentially reads out velocity data of said velocity table memory.

10. The motor control apparatus according to claim 9, wherein said memory access control portion starts memory access at any address inside said velocity table memory to end at any address, and an interruption to said CPU controlling a series operation occurs after said memory access control portion ends memory access.

11. The motor control apparatus according to claim 9, wherein said memory access control portion stops reading out at a prescribed end address, if a read-out address determined by said register passes said prescribed end address.

12. The motor control apparatus according to claim 9, wherein said memory access control portion comprises a bus arbitration portion to access a velocity table memory to drive-control a plurality of motors.

13. The motor control apparatus according to claim 9, wherein said phase signal generating portion sequentially switches and outputs as motor control signals contents of said register, which has bit width enough to be capable of expressing a combination of phases for controlling motors.

14. The motor control apparatus according to claim 1, wherein said memory access control portion enables memory access to said velocity table memory in response to the time data output by said time conversion portion.

* * * * *

UNITED STATES PATENT AND TRADEMARK OFFICE
CERTIFICATE OF CORRECTION

PATENT NO. : 6,563,282 B2
DATED : May 13, 2003
INVENTOR(S) : Tetsuya Morita

It is certified that error appears in the above-identified patent and that said Letters Patent is hereby corrected as shown below:

Column 6,
Line 51, "A[3]in" should read -- A[3] in --.
Line 58, "B phase." should read -- B phase). --.

Column 8,
Line 11, "a" (2nd occurrence) should be deleted.

Signed and Sealed this

Second Day of December, 2003

JAMES E. ROGAN
*Director of the United States Patent and Trademark Office*